US012344460B2

(12) United States Patent
Nagasawa

(10) Patent No.: US 12,344,460 B2
(45) Date of Patent: Jul. 1, 2025

(54) DELIVERY UNIT AND DELIVERY SYSTEM

(71) Applicant: MEDIPAL HOLDINGS CORPORATION, Tokyo (JP)

(72) Inventor: Kazunori Nagasawa, Tokyo (JP)

(73) Assignee: MEDIPAL HOLDINGS CORPORATION, Tokyo (JP)

( * ) Notice: Subject to any disclaimer, the term of this patent is extended or adjusted under 35 U.S.C. 154(b) by 450 days.

(21) Appl. No.: 17/807,824

(22) Filed: Jun. 20, 2022

(65) Prior Publication Data

US 2022/0315319 A1 Oct. 6, 2022

Related U.S. Application Data

(60) Division of application No. 17/024,536, filed on Sep. 17, 2020, now Pat. No. 11,884,481, which is a
(Continued)

(30) Foreign Application Priority Data

Mar. 20, 2018 (JP) .................. 2018-052576

(51) Int. Cl.
*B65D 88/12* (2006.01)
*F25D 3/10* (2006.01)
(Continued)

(52) U.S. Cl.
CPC .............. *B65D 88/12* (2013.01); *F25D 3/10* (2013.01); *G01D 9/007* (2021.05); *G06Q 10/083* (2013.01)

(58) Field of Classification Search
CPC ......... B65D 88/12; F25D 23/12; F25D 29/00; F25D 3/10; G01D 9/007; G06Q 10/083; G06Q 10/0832
See application file for complete search history.

(56) References Cited

U.S. PATENT DOCUMENTS 4,607,489 A * 8/1986 Krongold .................. F25D 3/10
62/307
5,309,722 A * 5/1994 Phillips, Jr. ............... F25D 3/10
62/52.1
(Continued)

FOREIGN PATENT DOCUMENTS

JP H0728907 A * 1/1995
JP 2004217326 A * 8/2004
(Continued)

OTHER PUBLICATIONS

European Patent Office, Extended European Search Report dated Nov. 5, 2021 in European Patent Application No. 18910745.1, 9 pages.
(Continued)

*Primary Examiner* — Yoshihisa Ishizuka
(74) *Attorney, Agent, or Firm* — MASUVALLEY & PARTNERS; Peter Martinez

(57) ABSTRACT

The present invention is to issue a quality certificate on which a graphic image representing the quality in chronological order of a cooling environment in a container accommodating articles therein is printed on a recording medium, upon arrival of the articles at a delivery destination. A delivery unit 15 is mounted on a vehicle 21 and is used to deliver the articles accommodated in a storage container 33 filled with a cooling gas. The delivery unit 15 includes a thermometer Se1 that measures a temperature in the storage container 33, a memory unit 53 that memorizes therein data of the measured temperature in chronological order, a quality-data generation unit 55a that generates quality data of articles based on temperature data acquired from the memory unit 53, a print-data editing unit 55h that edits print data relating to a quality certificate including a graphic image representing the quality in chronological order of the cooling environment in the storage container 33 accommo-
(Continued)

[PERSPECTIVE DIAGRAM OF VEHICLE]

dating articles therein during delivery based on a serial number of the article and the quality data, and a printer 27 that prints print data relating to the quality certificate on a recording medium.

6 Claims, 33 Drawing Sheets

Related U.S. Application Data continuation of application No. PCT/JP2018/023834, filed on Jun. 22, 2018.

(51) Int. Cl.
*G01D 9/00* (2006.01)
*G06Q 10/083* (2024.01)

(56) References Cited

U.S. PATENT DOCUMENTS

| | | | |
|---|---|---|---|
| 11,234,110 B2 | 1/2022 | Lai et al. | |
| 11,884,481 B2 | 1/2024 | Nagasawa | |
| 11,913,841 B2 | 2/2024 | Philli et al. | |
| 11,978,007 B2 | 5/2024 | Bae et al. | |
| 12,162,673 B2 | 12/2024 | Nagasawa | |
| 2015/0046364 A1 | 2/2015 | Kriss | |
| 2017/0300925 A1 | 10/2017 | Atkinson | |
| 2017/0352002 A1 | 12/2017 | Lam | |
| 2019/0303862 A1 | 10/2019 | Bollinger et al. | |

FOREIGN PATENT DOCUMENTS

| | | | |
|---|---|---|---|
| JP | 2004-269178 A | | 9/2004 |
| JP | 2005075595 A | * | 3/2005 |
| JP | 2007219646 A | * | 8/2007 |
| JP | 2009-051651 A | | 3/2009 |

OTHER PUBLICATIONS

WIPO, Japan International Search Authority, International Search Report mailed Sep. 18, 2018 in International Patent Application No. PCT/JP2018/023834, 16 pages.
United States Patent and Trademark Office, Office Action mailed Feb. 13, 2025 in U.S. Appl. No. 17/808,252, 7 pages.
United States Patent and Trademark Office, Office Action mailed Feb. 27, 2025 in U.S. Appl. No. 17/807,844, 12 pages.

* cited by examiner

SHIPPING INFORMATION

PRODUCT CODE
SERIAL NUMBER
LOT NUMBER
EXPIRATION DATE
TAG CODE

UNIT NUMBER
UNIT TYPE

DATE AND TIME
WORK STATUS (b)

MANAGEMENT FILE

MANAGEMENT No.
SERIAL NUMBER

LOT NUMBER
EXPIRATION DATE
TAG CODE
UNIT NUMBER
PRODUCT CODE (c)

UNIT No. MANAGEMENT FILE

UNIT NUMBER

STATUS
MANAGEMENT No.
UNIT TYPE (d)

TRACE FILE

PRODUCT CODE
DATE AND TIME
LOT NUMBER
EXPIRATION DATE
SERIAL NUMBER

UNIT NUMBER
WORK STATUS

FIG.10
(a)
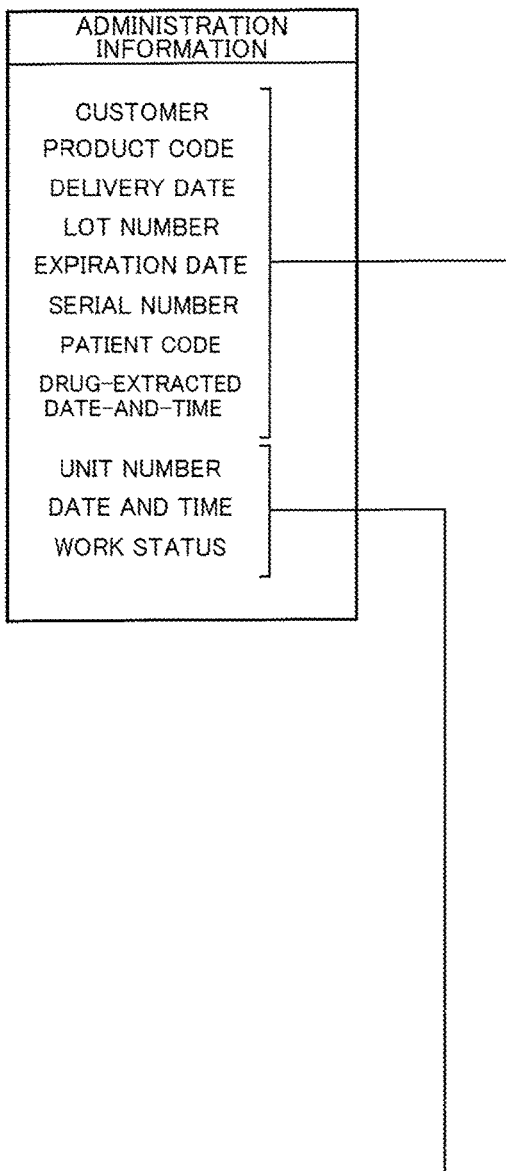
(b)
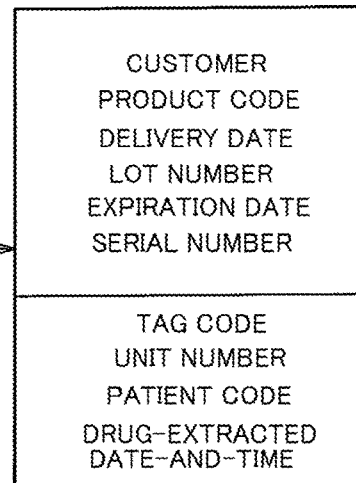
(c)
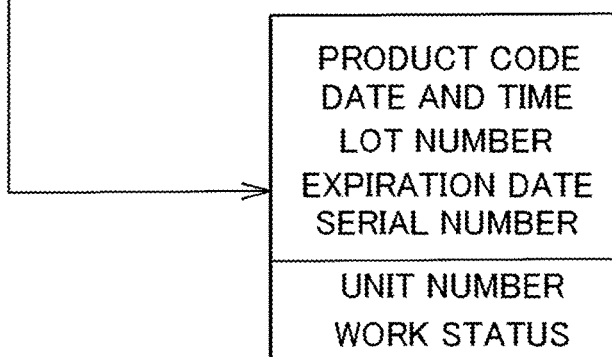

DELIVERY UNIT AND DELIVERY SYSTEM

CROSS-REFERENCE TO RELATED APPLICATIONS

The present application is a divisional of and claims priority to U.S. patent application Ser. No. 17/024,536, filed Sep. 17, 2020, entitled Delivery Unit and Delivery System, which is a continuation application of International Application PCT/JP2018/023834 filed on Jun. 22, 2018, and designated U.S., entitled Delivery Unit and Delivery System, which claims priority to Japanese Patent Application No. 2018-052576 filed Mar. 20, 2018, entitled Delivery Unit and Delivery System, all of which are incorporated herein by reference in their entireties.

FIELD

The present invention relates to a delivery unit that is mounted on a vehicle and is used at the time of accommodating articles in a container filled with a cooling gas and delivering the articles, and a delivery system.

BACKGROUND

Conventionally, when fresh food is delivered to a distance, the fresh food is accommodated in a refrigerated car and delivered. Further, when pharmaceutical products are delivered to a distance, a technique of accommodating the pharmaceutical products and a refrigerant together in a cooler box and delivering the pharmaceutical products is known.

For example, the following Patent Literatures are known as a technique of delivering articles in a cooled condition.

Patent Literature 1 has an object to provide a temperature management system of deliveries in which a predetermined concerned personnel can ascertain the history of temperature data of a freight room of a delivery vehicle in a distribution process reliably and easily, and can perform accurate management while suppressing communication costs. Patent Literature 1 discloses a temperature management system of deliveries including a temperature sensor that wirelessly transmits detected temperature data, a GPS receiver, and a control device installed in the delivery vehicle. In the temperature management system, temperature data is detected by the temperature sensor arranged in the freight room at a set predetermined detection interval and the temperature data is memorized in the temperature sensor, and temporal positional data received by the GPS receiver is memorized in the control device. At a data access point in the distribution process, it is set such that the temperature data for a predetermined period memorized in the temperature sensor is wirelessly transmitted to the control device, so that the wirelessly transmitted temperature data and the temporal positional data in the predetermined period memorized in the control device are input to a server through a communication network and memorized therein, and a predetermined terminal device can access to the server through the communication network.

Patent Literature 2 has an object to provide a food preserving method and a food preserving device that can hold fresh food, particularly, food having a fast deterioration rate of freshness quality in a fresh state for a long time after harvest as compared with a conventional preserving method, without any change of color, change of properties, and damaging the taste. Patent Literature 2 discloses a food preserving method for preserving vegetable fresh food and animal fresh food in which air in a food storage container is replaced by a nitrogen gas so that oxygen in an ambient gas in the container becomes less than 1% by volume in order to maintain the inside of the food storage container in a cold misty condition of low temperature and high humidity, and when the fresh food is taken into or out from the food storage container, an ozone gas is added intermittently into the food storage container, so that the ambient temperature is maintained in a range of 1° C. to 10° C. and the relative humidity is maintained at 90% or higher.

Patent Literature 3 discloses a method of supplying liquefied oxygen to medical institutions such as a hospital by using an oxygen transportation vehicle including an in-vehicle tank that can hold the state of the liquefied oxygen. The method is a supply method of liquefied oxygen for medical use characterized in that the liquefied oxygen, after being transferred from the in-vehicle tank and filled in a hospital tank installed in a medical institution, is partly taken out and vaporized, the quality of the vaporized gaseous oxygen is then checked on the basis of pharmacopoeia oxygen, and after confirmation that the vaporized gaseous oxygen satisfies the standard of the pharmacopoeia oxygen, the transfer and filling of the liquefied oxygen are complete.

Patent Literature 3 also discloses that a certificate certifying that the liquefied oxygen in the in-vehicle tank and the liquefied oxygen in the hospital tank are not listed as the pharmacopoeia liquefied oxygen is submitted to the medical institutions.

A certificate certifying that the LO in the in-vehicle tank and the LO in the hospital tank are not listed as the pharmacopoeia liquefied oxygen can be submitted also to hospitals.

CITATION LIST

Patent Literatures

Patent Literature 1: Japanese Patent Application Laid-open No. 2009-7097
Patent Literature 2: Japanese Patent Application Laid-open No. 2003-116460
Patent Literature 3: Japanese Patent Application Laid-open No. 2004-125168

SUMMARY

Technical Problem

As described above, to maintain articles in a temperature range capable of guaranteeing the quality thereof, the inside of a container needs to be cooled. When a vehicle arrives at a delivery destination, the container accommodating the articles therein has been simply handed over to the delivery destination.

However, when the articles arrive at the delivery destination, a printed quality certificate indicating the quality of a cooling environment in the container accommodating articles therein during delivery cannot be handed over to the delivery destination. Therefore, there is a problem in that at the delivery destination, it is not possible to confirm immediately the quality in chronological order of the cooling environment in the container, upon reception of the container that accommodates the articles therein.

In Patent Literature 1, it is required to prepare the terminal device, acquire temperature data to the terminal device by accessing the server via the communication network, and present the temperature data on a monitor. However, in Patent Literature 1, the terminal device needs to be prepared when the delivery vehicle arrives at the delivery destination.

In Patent Literature 2, air in the container is replaced by a nitrogen gas to cool fresh food in the food storage container. However, there is a problem in that the quality in chronological order of a cooling environment in the container cannot be confirmed immediately at the site, when the delivery vehicle arrives at a delivery destination.

In Patent Literature 3, there is a problem in that the quality in chronological order of a cooling environment in the in-vehicle tank cannot be confirmed immediately at the site, although a certificate certifying that the liquefied oxygen in the in-vehicle tank is not listed as the pharmacopoeia liquefied oxygen can be submitted to the medical institutions.

One embodiment of the present invention has been achieved in view of the problems described above, and an object of the present invention is to issue a quality certificate by printing a graphic image representing the quality in chronological order of a cooling environment in a container accommodating articles therein on a recording medium, when the articles arrive at a delivery destination.

Solution to Problem

In order to solve the above problems, the invention of claim 1 provides a delivery unit mounted on a vehicle and is used when articles are accommodated in a container filled with a cooling gas and delivered, the delivery unit comprising: a temperature measurement unit that measures a temperature in the container; a memory unit that memorizes therein the measured temperature data in chronological order; a quality-data generation unit that generates quality data of the articles based on temperature data acquired from the memory unit; a print-data editing unit that edits print data relating to a quality certificate including a graphic image representing quality in chronological order of a cooling environment in a container that accommodates articles therein during delivery, based on a serial number of the article and the quality data; and a printing unit that prints print data relating to the quality certificate on a recording medium.

Advantageous Effects of Invention

According to the present invention, it is possible to issue a quality certificate by printing a graphic image representing the quality in chronological order of a cooling environment in a container accommodating articles therein on a recording medium, when the articles arrive at a delivery destination. Accordingly, at the delivery destination, the quality in chronological order of the cooling environment in the container can be confirmed immediately at the site, upon reception of the container that accommodates the articles therein.

BRIEF DESCRIPTION OF DRAWINGS

FIGS. 7(a) to (d) are diagrams illustrating association in a shipping-information association file according to the first embodiment of the present invention.

FIGS. 10(a) to (c) are diagrams illustrating association in an administration-information association file according to the first embodiment of the present invention.

DESCRIPTION OF EMBODIMENTS

Figure 1:
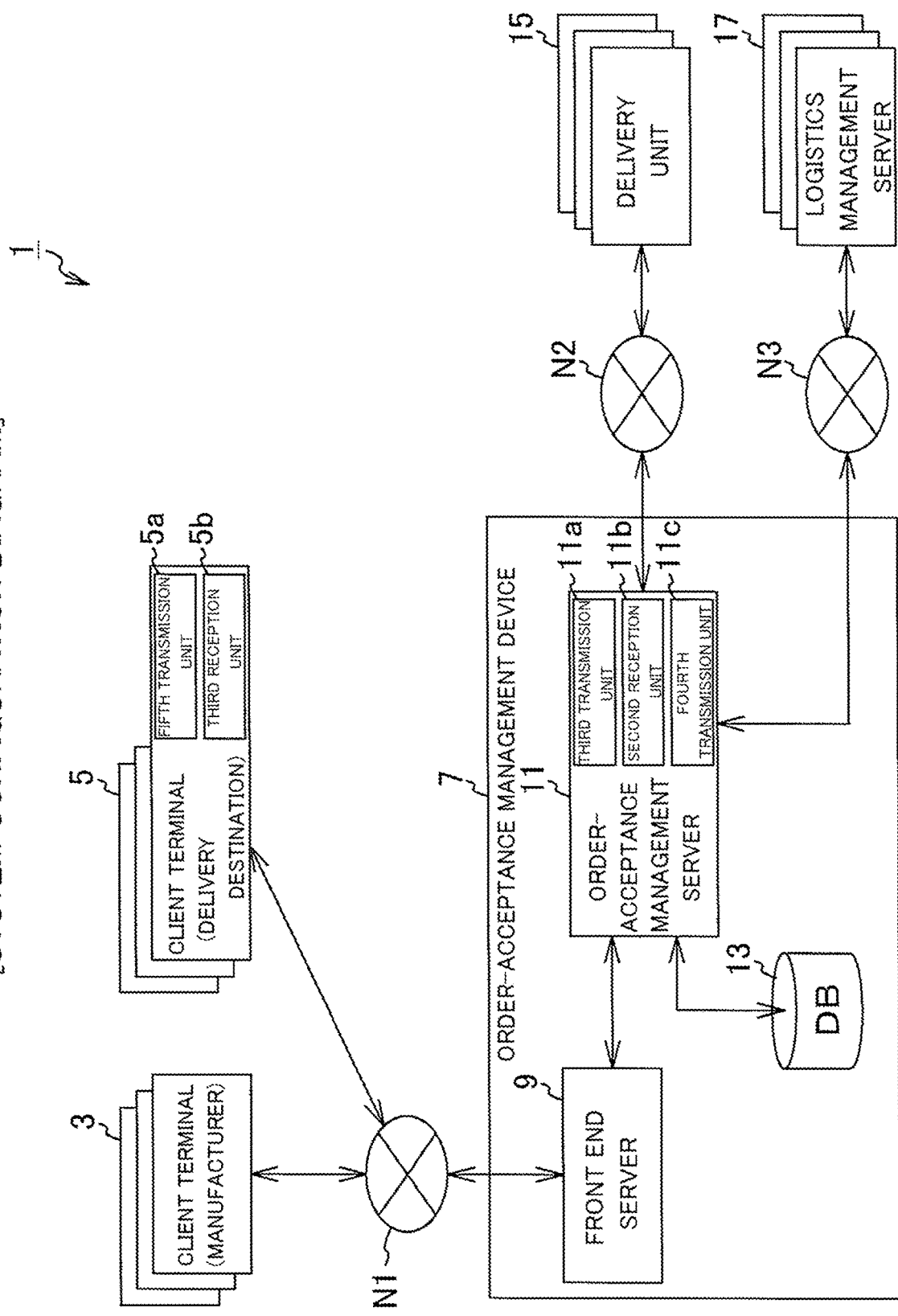
FIG. 1 is a block diagram of a delivery system according to a first embodiment of the present invention.

The present invention is described below in detail based on embodiments illustrated in the drawings.

The present invention has a configuration described below in order to issue a quality certificate by printing a graphic image representing the quality in chronological order of a cooling environment in a container accommodating articles therein on a recording medium, when the articles arrive at a delivery destination.

That is, a delivery unit according to the present invention is a delivery unit mounted on a vehicle and is used when articles are accommodated in a container filled with a cooling gas and delivered. The delivery unit is characterized by including a temperature measurement unit that measures a temperature in the container, a memory unit that memorizes therein measured temperature data in chronological order, a quality-data generation unit that generates quality data of articles based on the temperature data acquired from the memory unit, a print-data editing unit that edits print data relating to a quality certificate including a graphic image representing the quality in chronological order of a cooling environment in the container accommodating articles therein during delivery, based on a serial number of the article and the quality data, and a printing unit that prints the print data relating to the quality certificate on a recording medium.

With the above configuration, it is possible to issue a quality certificate by printing a graphic image representing the quality in chronological order of a cooling environment in a container accommodating articles therein on a recording medium, when the articles arrive at a delivery destination. Accordingly, at the delivery destination, the quality in chronological order of the cooling environment in the container can be confirmed immediately at the site, upon reception of the container that accommodates the articles therein.

Characteristics of the present invention described above are explained in detail with reference to the drawings mentioned below. Note that, unless otherwise specified, constituent elements, types, combinations, shapes, and relative arrangements thereof described in the following embodiments are not intended to limit the scope of the present invention solely thereto and are only explanatory examples.

Characteristics of the present invention described above are explained below in detail with reference to the drawings.

First Embodiment

<Delivery System>

FIG. 1 is a block diagram of a delivery system according to a first embodiment of the present invention.

A delivery system 1 is configured by a client terminal (a manufacturer) 3, a client terminal (a delivery destination) 5, networks N1, N2, and N3, an order-acceptance management device 7, an order-acceptance management server 11, a delivery unit 15, a logistics management server 17, and the like. In the present embodiment, although there are plural client terminals 3, client terminals (delivery destinations) 5, delivery units 15, and logistics management servers 17, these elements may be each a single unit. Further, although the networks are separate networks of N1, N2, and N3, the networks may be configured by the same network.

In the delivery system 1, the client terminal 3 (generally, a PC) installed, for example, in a drug manufacturer, and the client terminal 5 (generally, a PC) installed in medical institutions, for example, hospitals and doctor's offices are connected to the order-acceptance management device 7 via the network N1.

The client terminal 5 includes a fifth transmission unit 5a and a third reception unit 5b. The fifth transmission unit 5a transmits a quality data request to the order-acceptance management server 11 as needed. The third reception unit 5b receives the quality data from the server.

The order-acceptance management device 7 is configured to include a front end server 9, the order-acceptance management server 11, and a database DB 13.

The front end server 9 has a function of receiving data from the client terminal 3 via the network N1, to manage a direct access service to the client terminal 3 and a change of a display format.

The order-acceptance management server 11 has a function of generating respective pieces of order-acceptance data based on usage date data received from the respective client terminals 3 to transmit the order-acceptance data to the order-acceptance management server 11 of a deliverer, and a function of generating a personal calendar screen corresponding to each client to transmit the screen to the client terminal 3.

The order-acceptance management server 11 also receives data from the delivery unit 15 via the network N2 to manage the state (status) of each delivery unit 15.

Further, the order-acceptance management server 11 receives data from the logistics management server 17 via the network N3 to manage the state (status) of each logistics management server 17.

The order-acceptance management server 11 includes therein a ROM (Read Only Memory), a RAM (Random Access Memory), a CPU (Central Processing Unit), and an HDD (Hard Disk Drive), reads an operating system OS from the HDD and loads the OS on the RAM to activate the OS, and reads an application program from the HDD to perform various processes under control of the OS.

The order-acceptance management server 11 includes a second reception unit 11b, the database DB 13, a third transmission unit 11a, and a fourth transmission unit 11c. The second reception unit 11b receives quality data from the delivery unit 15. The database DB 13 accumulates therein the quality data received from the delivery unit 15. The third transmission unit 11a transmits the quality data acquired from the database DB 13 to the delivery unit 15, upon reception of a quality data request from the delivery unit 15. The fourth transmission unit 11c transmits the quality data acquired from the database DB 13 to the client terminal 5, upon reception of a quality data request from the client terminal 5.

The logistics management server 17 is arranged for each warehouse that stores respective articles therein or for each warehouse that stores a plurality of articles therein, and when there is a request from the logistics management server 17, generates pieces of delivery information associated with respective articles and the delivery unit 15 to transmit the delivery information to the order-acceptance management server 11, in order to execute control for shipping the relevant articles to the client.

The delivery unit 15 includes a storage container mounted thereon that accommodates specific pharmaceutical products required to be maintained in a predetermined low-temperature condition, and has a function of transmitting the temperature data to the order-acceptance management server 11 via the network N2. Therefore, after having used for delivering the pharmaceutical products to the client, the delivery unit 15 that has stored the pharmaceutical products therein needs to be collected.

<Vehicle>

Figure 2:
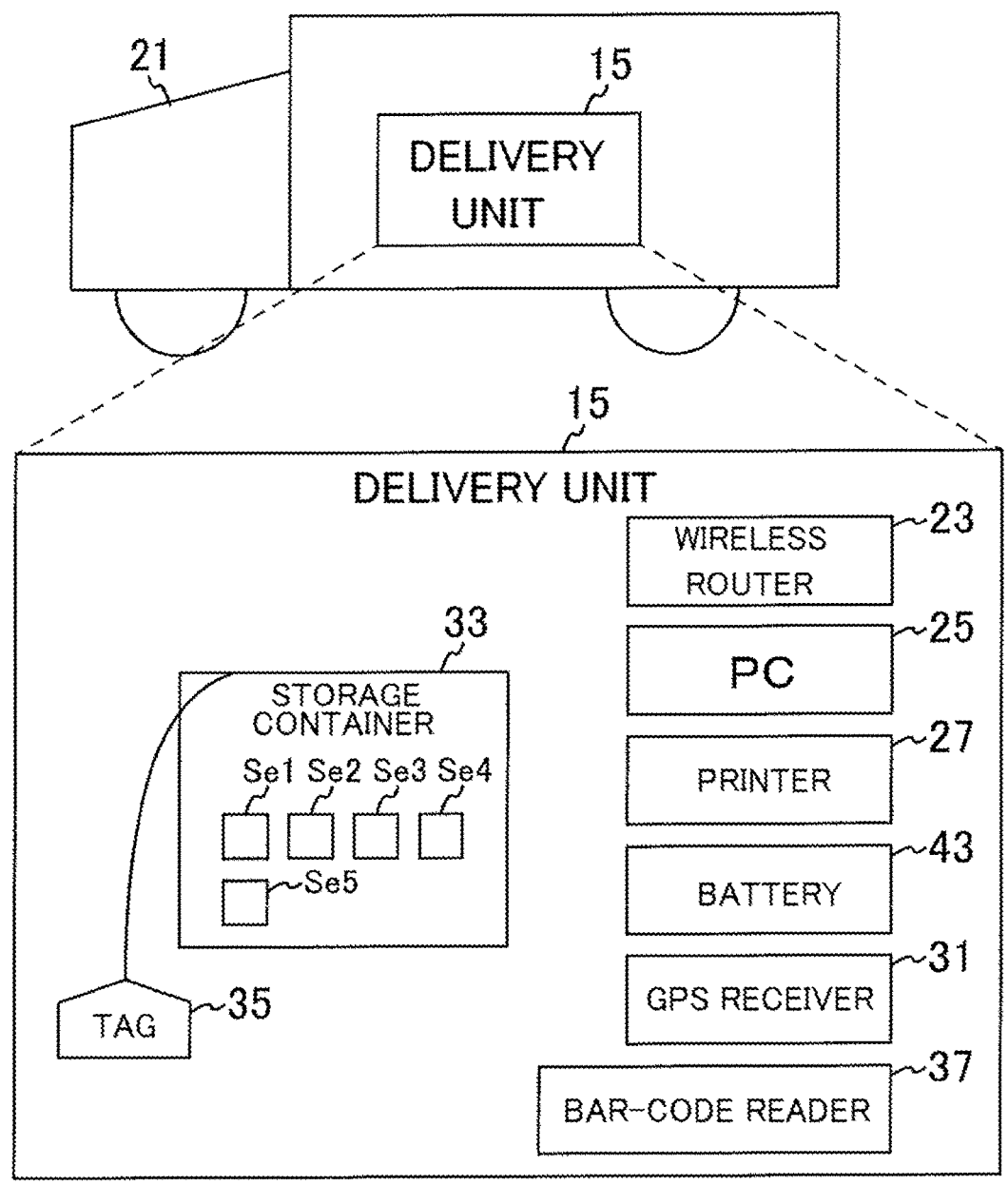
FIG. 2 is a diagram illustrating a vehicle mounted with a delivery unit according to the first embodiment of the present invention.

FIG. 2 is a diagram illustrating a vehicle mounted with the delivery unit 15 according to the first embodiment of the present invention.

A vehicle 21 has a delivery unit 15 mounted on a loading platform thereof. Further, the delivery unit 15 includes a wireless router 23, a personal computer PC 25, a printer 27, a battery 43, a GPS receiver 31, and a storage container 33.

In the storage container 33, a plurality of sensors Se1 to Se5 are accommodated or attached thereto, and a part of a tag string fastened to each article accommodated in the storage container 33 is pulled outside, and a tag 35 is fastened at the end thereof.

<Delivery Unit>

Figure 3A:
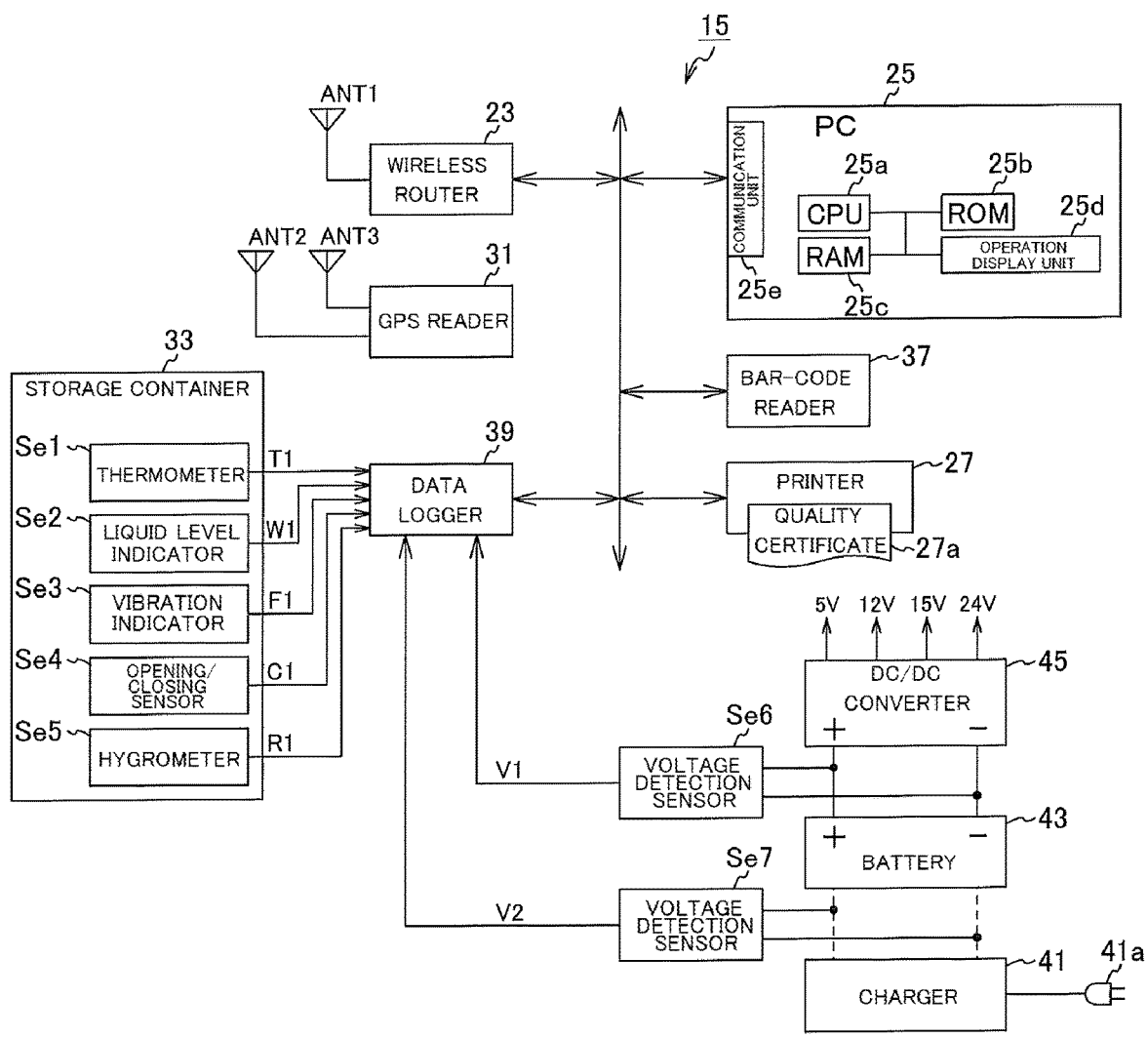
FIG. 3A is a block diagram illustrating respective units provided in the delivery unit according to the first embodiment of the present invention.

FIG. 3(a) is a block diagram illustrating respective units provided in the delivery unit 15 according to the first embodiment of the present invention.

The delivery unit 15 includes the wireless router 23, the personal computer PC 25, the printer 27, the GPS receiver 31, the storage container 33, a bar-code reader 37, a data logger 39, a charger 41, the battery 43, and a DC/DC converter 45.

The wireless router 23 accesses a plurality of 3G/4G lines arranged on the road where the vehicle 21 runs, and connects to the personal computer PC 25, to connect the personal computer PC 25 and the order-acceptance management server 11 with each other.

The personal computer PC 25 includes a CPU 25a, a ROM 25b, a RAM 25c, an operation display unit 25d, and a communication unit 25e.

The CPU 25a controls the entire operation of the delivery unit 15 by using the RAM 25c as a work memory, according to a program memorized beforehand in the ROM 25b.

The ROM 25b is a read-only non-volatile memory medium, and stores therein firmware and various kinds of data.

The RAM 25c is a volatile memory medium capable of high-speed reading and writing of information and can be used as a work memory.

The operation display unit 25d includes key buttons and a screen for displaying a menu for performing various setting and mode selection, and receives various kinds of operation requests from a user. The communication unit 25e has a USB interface, and transmits and receives data to and from the order-acceptance management server 11 via the wireless router 23 and the network N2.

The printer 27 prints a quality certificate 27a on a recording medium such as a sheet according to a printing job received from the personal computer PC 25.

The GPS receiver 31 receives a radio signal from a plurality of GPS satellites via an antenna ANT2 to calculate positional information of the delivery unit 15, and transmits the calculated positional information to the order-acceptance management server 11 via an antenna ANT3 and the network N2. In FIG. 3, the GPS receiver 31 is not connected to the personal computer PC 25. However, the GPS receiver 31 may be connected to the personal computer PC 25 to output the positional information calculated by the GPS receiver 31 to the personal computer PC 25.

The storage container 33 can accommodate therein a plurality of articles, and includes various kinds of sensors Se1 to Se5 therein or attached to the outside thereof.

The bar-code reader 37 reads a bar-code and outputs data to the personal computer PC 25.

The data logger 39 collects measurement data measured by each sensor, stores various kinds of data therein, and outputs the stored various kinds of data to the personal computer PC 25 according to the request for the readout of the personal computer PC 25.

The charger 41 connects, for example, to an AC power supply provided in the vehicle 21 or an AC power supply provided in a delivery center as needed, to convert AC power supplied from the AC power supply to DC power, and connects the DC power to each electrode of the battery 43 to charge the battery 43.

When the charger 41 is connected to each electrode (ON), the battery 43 is charged with the DC power supplied from the charger 41, and when connection between the charger 41 and the respective electrodes is released (OFF), the battery 43 discharges and supplies the DC power to the DC/DC converter 45.

The DC/DC converter 45 converts the DC power supply supplied from the battery 43 to DC power of, for example, four kinds of voltage levels (5V, 12V, 15V, and 24V) and supplies the DC power to each unit in the delivery unit 15.

A thermometer Se1 is provided in the storage container 33 to measure an ambient temperature in the storage container 33, and outputs temperature data to the data logger 39.

A liquid level indicator Se2 is provided in the storage container 33 to measure a liquid level of a liquefied cooling gas, and outputs liquid level data to the data logger 39.

A vibration indicator Se3 is provided outside the storage container 33 to measure vibrations applied to the storage container 33, and outputs vibration data to the data logger 39.

An opening/closing sensor Se4 is provided in the storage container 33 to detect whether a lid of the storage container 33 is in an opened state or a closed state and outputs opening/closing data to the data logger 39.

A hygrometer Se5 is provided in the storage container 33 to measure an ambient humidity in the storage container 33, and outputs humidity data to the data logger 39.

A voltage detection sensor Se6 measures a voltage of DC power supplied from the battery 43 to the DC/DC converter 45, and outputs voltage data to the data logger 39.

A voltage detection sensor Se7 measures a voltage of DC power supplied from the charger 41 to the battery 43, and outputs voltage data to the data logger 39.

<Functional Block Diagram of Delivery Unit>

Figure 3B:
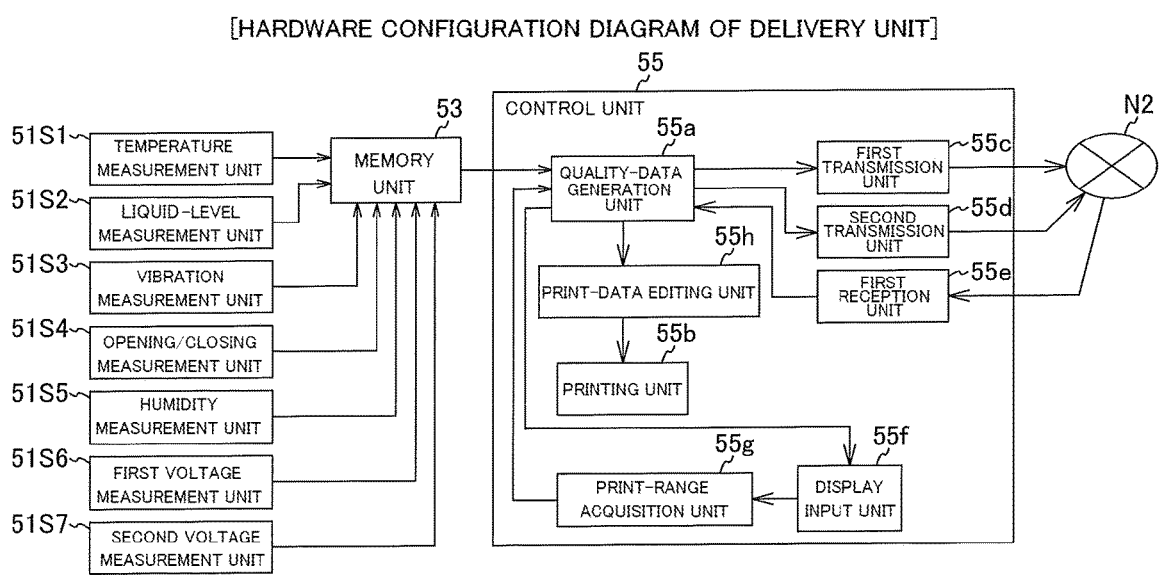
FIG. 3B is a functional block diagram illustrating functions of the respective units of the delivery unit according to the first embodiment of the present invention.

FIG. 3(b) is a functional block diagram illustrating functions of respective units of the delivery unit 15 according to the first embodiment of the present invention.

In the personal computer PC 25, the CPU 25a reads the operating system OS from the ROM 25b and loads the OS on the RAM 25c to activate the OS, and reads a program (programs illustrated in various flowcharts described later) from the ROM 25b to perform various processes under control of the OS, thereby realizing a control unit 55 illustrated in FIG. 3(b).

A temperature measurement unit 51s1 is configured by the thermometer Se1 to measure a temperature in the storage container 33 and outputs measured data to a memory unit 53.

A liquid-level measurement unit 51s2 is configured by the liquid level indicator Se2 to measure a level of a cooling gas filled in the storage container 33 and outputs measured data to the memory unit 53.

A vibration measurement unit 51s3 is configured by the vibration indicator Se3 to measure vibrations applied to the storage container 33 from a road surface via the vehicle and outputs measured data to the memory unit 53.

An opening/closing measurement unit 51s4 is configured by the opening/closing sensor Se4 to measure an opened/closed state of the lid provided in the storage container 33 and outputs the measured state to the memory unit 53.

A humidity measurement unit 51s5 is configured by the hygrometer Se5 to measure a humidity in the storage container 33 and outputs measured data to the memory unit 53.

A first voltage measurement unit 51s6 is configured by the voltage detection sensor Se6 to measure a voltage of DC power supplied from the battery 43 to the DC/DC converter 45, and outputs measured data to the memory unit 53.

A second voltage measurement unit 51s7 is configured by the voltage detection sensor Se7 to measure a voltage of DC power supplied from the charger 41 to the battery 43, and outputs measured data to the memory unit 53.

The memory unit 53 is configured by the data logger 39, and memorizes therein temperature data measured by the respective measurement units in chronological order. A hard disk HDD may be used as the memory unit 53 instead of the data logger 39.

The control unit 55 includes a quality-data generation unit 55a, a printing unit 55b, a first transmission unit 55c, a second transmission unit 55d, a first reception unit 55e, a display input unit 55f, and a print-range acquisition unit 55g. The control unit 55 controls each unit provided therein.

The quality-data generation unit 55a generates quality data of articles based on the temperature data acquired from the memory unit 53.

The quality-data generation unit 55a generates quality data of articles based on the temperature data acquired from the memory unit 53 corresponding to a printing date-and-time range acquired from the print-range acquisition unit 55g.

The print-range acquisition unit 55g acquires the printing date-and-time range represented by a printing start date-and-time to a printing end date-and-time displayed on the display input unit 55f.

A print-data editing unit 55h edits print data relating to a quality certificate including a graphic image representing the quality in chronological order of a cooling environment in the storage container 33 accommodating articles therein during delivery, based on a serial number of the article and quality data.

The printing unit 55b prints print data relating to a quality certificate on a recording medium.

The display input unit 55f displays a printing start date-and-time column and a printing end date-and-time column to prompt input of a printing date-and-time range associated with the temperature data to be printed on the quality certificate.

The first transmission unit 55c transmits the quality data generated by the quality-data generation unit 55a to the order-acceptance management server 11. The second transmission unit 55d transmits a quality data request to the order-acceptance management server 11 as needed. The first reception unit 55e receives the quality data from the order-acceptance management server 11.

<Transport of Articles>

Figure 4:
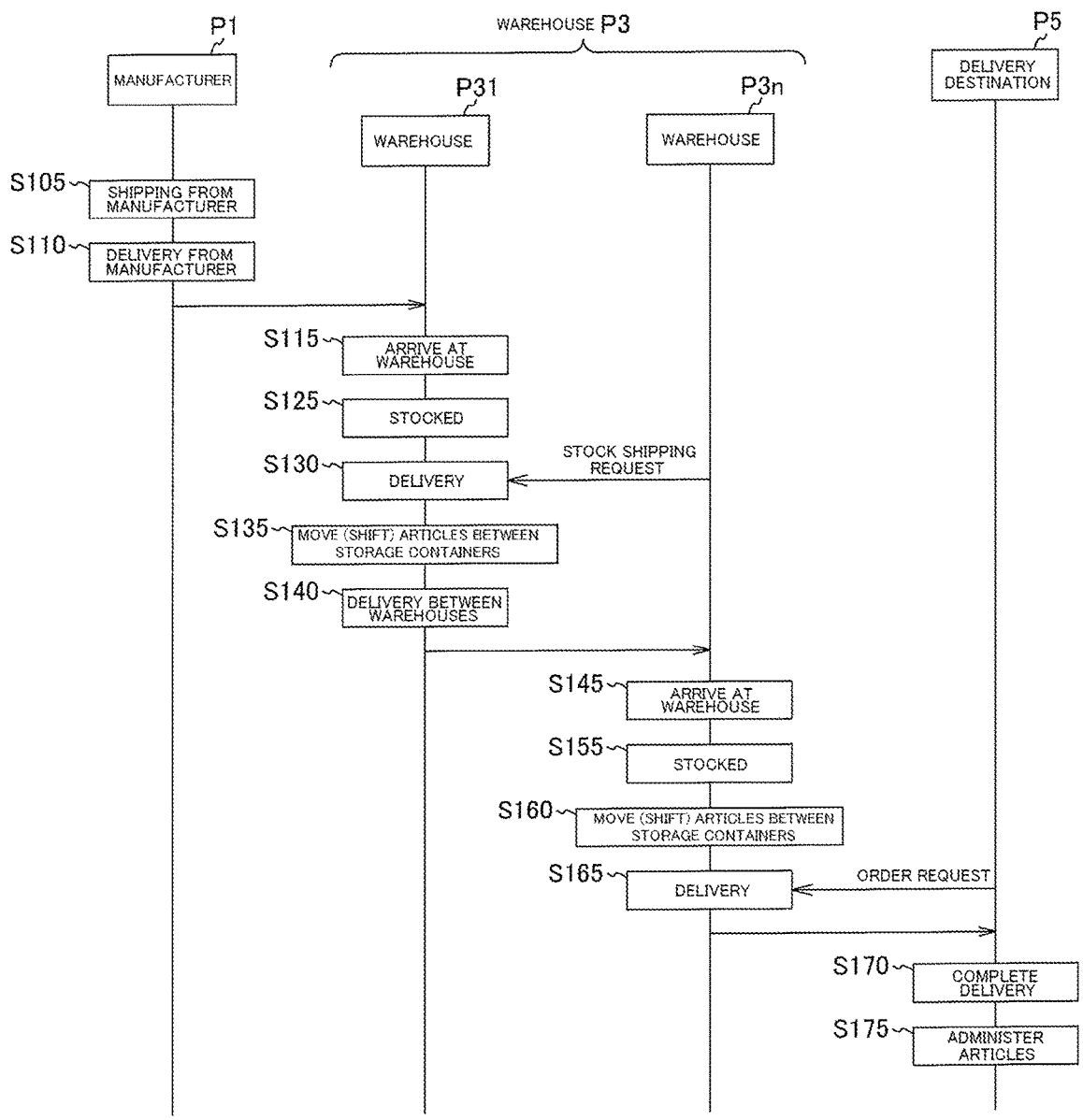
FIG. 4 is a diagram illustrating a flow in transport of articles according to the first embodiment of the present invention.

FIG. 4 is a diagram illustrating a flow in transport of articles according to the first embodiment of the present invention.

FIG. 4 illustrates that articles manufactured in a manufacturer P1 are delivered to a delivery destination P5 via a warehouse P31 and a warehouse P3n.

In the manufacturer P1, at step S105, articles are shipped, and at step S110, the articles are loaded on a vehicle to start delivery to the warehouse P31.

In the warehouse P31, when the vehicle loaded with the articles arrives at the warehouse P31 at step S115, the articles are placed under management of the warehouse P31 upon arrival thereof to the warehouse at step S120. At this time, the logistics management server 17 reads the bar-code from the tag 35 by using a bar-code reader arranged in the warehouse to generate an arrival label.

At step S125, the articles are stocked in a predetermined place. At this time, the bar-code of the delivery unit 15 is read and stored by using the bar-code reader arranged in the warehouse.

At step S130, when a stock delivery request is received from the warehouse P3n, the articles are delivered from the predetermined place.

At step S135, a lid of a first storage container 33 storing the articles therein is opened, and a lid of a second storage container 33 for transporting the articles from the first storage container 33 to the warehouse P3n is opened. The articles are then shifted from the first storage container 33 to the second storage container 33, and the respective lids of the first storage container 33 and the second storage container 33 are closed. At this time, the opening/closing sensor Se4 of the delivery unit 15 outputs opening/closing data to the data logger 39 according to the opened state and closed state of the lid.

At step S140, inter-warehouse delivery of articles from the warehouse P31 to the warehouse P3n is performed.

In the warehouse P3n, when the vehicle loaded with the articles arrives at the warehouse P3n at step S145, the articles are received at step S150.

At step S155, the articles are stocked.

At step S160, the lid of the second storage container 33 storing the articles therein is opened, and a lid of a third storage container 33 for transporting the articles from the second storage container 33 to the delivery destination P5 is opened. The articles are moved (shipped) from the second storage container 33 to the third storage container 33, and the respective lids of the second storage container 33 and the third storage container 33 are closed. At this time, the opening/closing sensor Se4 of the delivery unit 15 outputs opening/closing data to the data logger 39 according to the opened state or the closed state of the lid.

At step S165, upon reception of an order request from the delivery destination P5, the articles are delivered from the warehouse P3n to the delivery destination P5.

At the delivery destination P5, at step S170, when the vehicle loaded with the articles arrives at the delivery destination P5, delivery is completed. At this time, by pressing a 'STATUS OPERATION' button B12 displayed on a monitor screen (FIG. 12(b)) of the personal computer PC 25 in the delivery unit 15, delivery is completed.

At step S175, the lid of the third storage container 33 is opened to take out the articles from the third storage container 33 and the articles are administered to patients.

<Operation at Time of Activating Delivery Unit>

Figure 5:
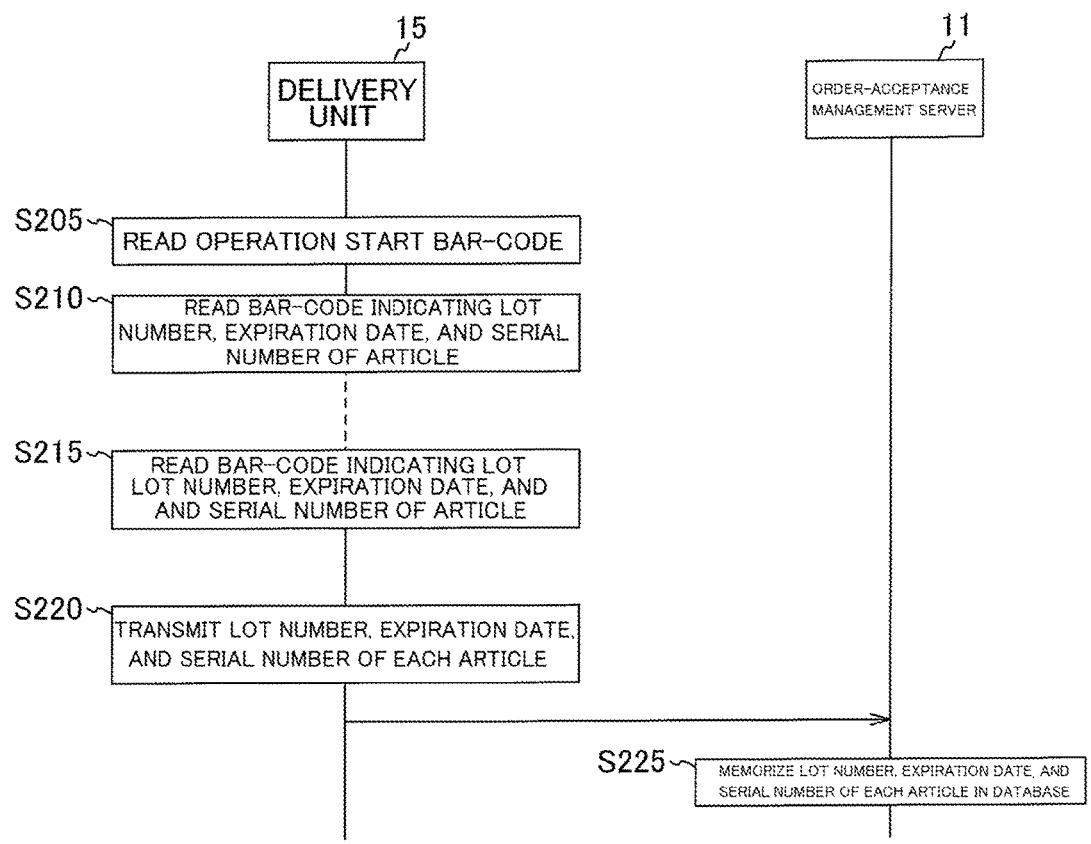
FIG. 5 is a sequence diagram illustrating an operation at the time of activating the delivery unit according to the first embodiment of the present invention.

FIG. 5 is a sequence diagram illustrating an operation at the time of activating the delivery unit according to the first embodiment of the present invention.

The sequence diagram illustrated in FIG. 5 illustrates an operation to be performed at the time of activation, when the delivery unit 15 is at the manufacturer's site.

In the delivery unit 15, at step S205, the PC 25 reads a bar-code from an operation start bar-code printed on the tag 35 by using the bar-code reader 37, and inputs the bar-code to the PC 25.

At step S210, the PC 25 reads a bar-code indicating a lot number, an expiration date, and a serial number of the articles printed on the product shipped from the manufacturer by using the bar-code reader 37, and inputs the bar-code to the PC 25.

When there are products shipped from another manufacturer, similar operation to that at step S210 is performed at step S215.

At step S220, the PC 25 transmits the lot number, the expiration date, and the serial number of each article to the order-acceptance management server 11 via the wireless router 23.

In the order-acceptance management server 11, at step S225, the data received from the delivery unit 15 is memorized in the database DB 13.

<Movement of Information and Articles Between Manufacturer and Warehouse>

Figure 6:
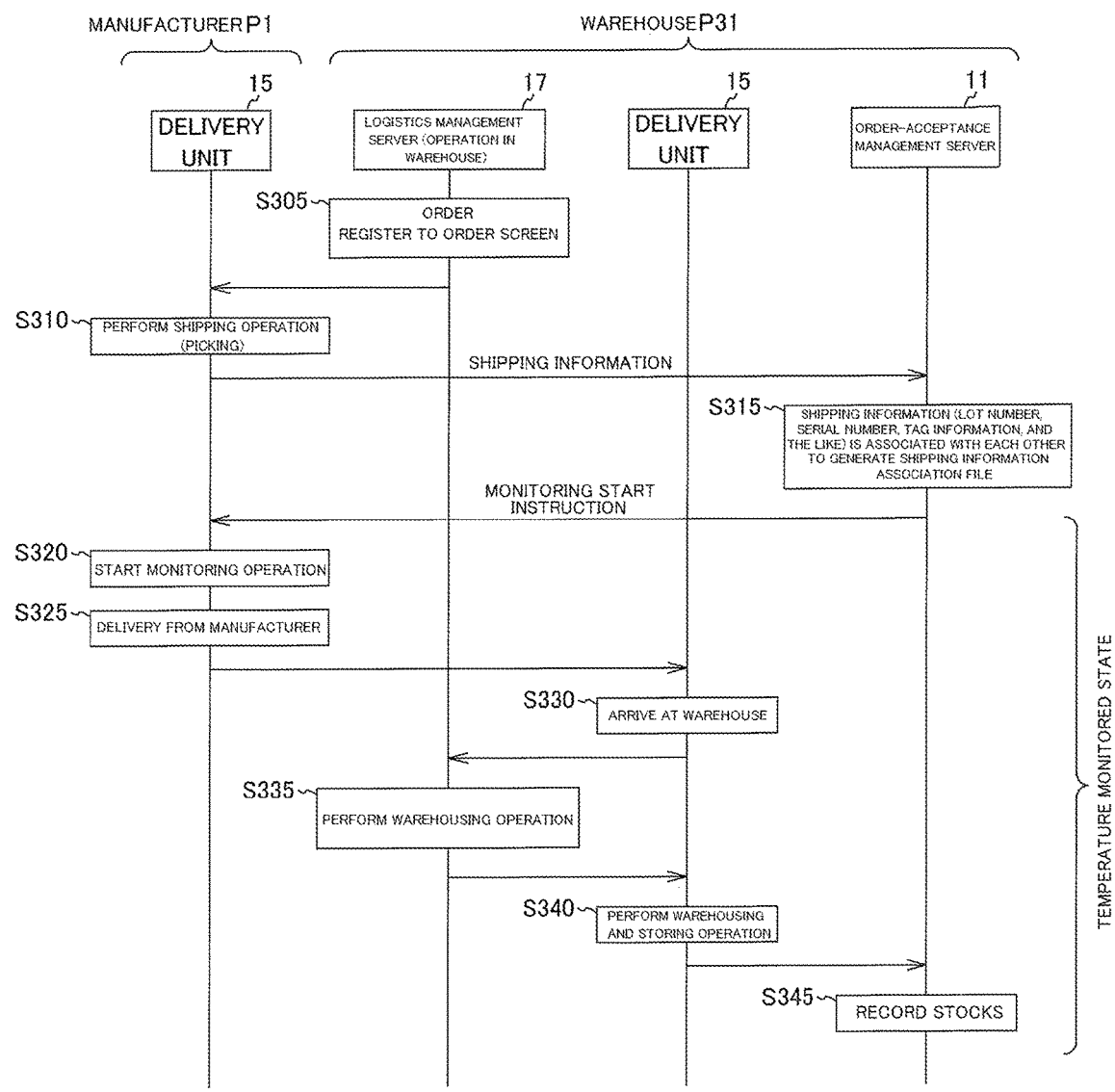
FIG. 6 is a sequence diagram illustrating movement of information and articles between a manufacturer and a warehouse according to the first embodiment of the present invention.

FIG. 6 is a sequence diagram illustrating movement of information and articles between the manufacturer and the warehouse according to the first embodiment of the present invention.

In the warehouse P3, at step S305, the logistics management server 17 performs registration to an order screen, as an order operation. At this time, the logistics management server 17 transmits order information to the delivery unit 15.

In the manufacturer P1, as a shipping operation, a required number of articles are picked up from a plurality of articles stocked in the warehouse by referring to a slip, and stores the articles in the storage container 33 of the delivery unit 15. At step S310, the delivery unit 15 reads the bar-code indicating the lot number, the expiration date, and the serial number of the articles, inputs the bar-code to the PC 25, and transmits the bar-code to the order-acceptance management server 11 via the wireless router 23.

In the warehouse P31, at step S315, the order-acceptance management server 11 generates a shipping-information association file by associating the pieces of shipping information (a lot number, an expiration date, a serial number, a tag information, and the like) with each other received from the delivery unit 15 (FIG. 7). The order-acceptance management server 11 then transmits a monitoring start instruction to the delivery unit 15.

In the manufacturer P1, at step S320, upon reception of the monitoring start instruction from the order-acceptance management server 11, the delivery unit 15 starts a monitoring operation. That is, the PC 25 receives measurement data from the sensors Se1 to Se7 recorded in the internal RAM of the data logger 39, and records the measurement data in the internal RAM of the PC 25. The recorded data is transmitted to the order-acceptance management server 11 via the network N2.

After Step S320, the process is under a temperature monitoring condition.

At step S325, the delivery unit 15 loaded on the vehicle starts delivery of articles from the manufacturer P1 to the warehouse P3.

In the warehouse P3, at step S330, the delivery unit 15 loaded with the articles arrives at the warehouse.

At step S335, the logistics management server 17 performs registration to a purchase screen as a warehousing operation.

At step S340, the delivery unit 15 transmits warehousing and storing information to the order-acceptance management server 11.

At step S345, the order-acceptance management server 11 performs a stock recording process corresponding to the received warehousing and storing information.

<Shipping-Information Association File>

FIGS. 7(a) to (d) are diagrams illustrating a file generated by being associated with shipping information according to the first embodiment of the present invention.

In the shipping information (FIG. 7(a)) transmitted from the delivery unit 15 to the order-acceptance management server 11, a product code, a serial number, a lot number, an expiration date, a tag code, a unit number, a unit type, a date and time, and a work status are included, and these pieces of data are memorized in the database DB 13.

The order-acceptance management server 11 extracts the lot number, the expiration date, the tag code, the unit number, and the product code from the shipping information (FIG. 7(a)) by using the serial number as a key, generates a management file (FIG. 7(b)) in which these pieces of data are associated with each other, and memorizes the management file in the database DB 13.

The order-acceptance management server 11 extracts the status, management number, and the unit type from the shipping information (FIG. 7(a)) by using the unit number as a key, generates a unit-number management file (FIG. 7(c)) in which these pieces of data are associated with each other, and memorizes the unit-number management file in the database DB 13.

The order-acceptance management server 11 extracts the unit number and the work status from the shipping information (FIG. 7(a)), by using the product code, the date and time, the lot number, the expiration date, and the serial number as a key, generates a trace file (FIG. 7(*d*)) in which these pieces of data are associated with each other, and memorizes the trace file in the database DB 13.

<Movement of Information and Articles Between Warehouse and Delivery Destination>

Figure 8:
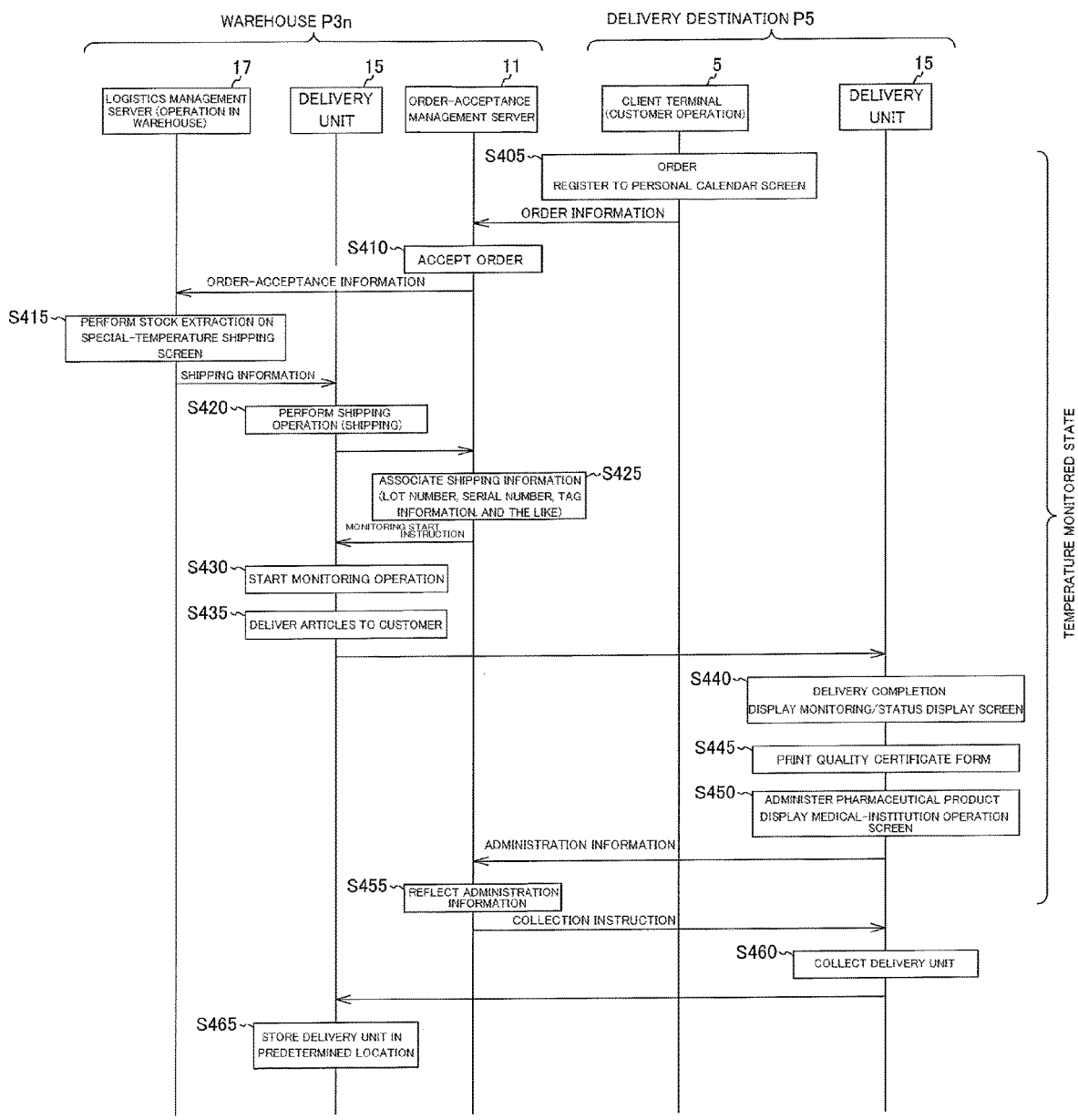
FIG. 8 is a sequence diagram illustrating movement of information and articles between the warehouse and a delivery destination according to the first embodiment of the present invention.

FIG. 8 is a sequence diagram illustrating movement of information and articles between the warehouse and the delivery destination according to the first embodiment of the present invention.

At the delivery destination P5, at step S405, the client terminal 5 performs registration to a personal calendar screen as an order operation and generates order information. The client terminal 5 transmits the order information to the order-acceptance management server 11.

In the warehouse P3, the order-acceptance management server 11 having received the order information from the client terminal 5 generates order-acceptance information based on the received order information at step S410, and registers the order-acceptance information in the database DB 13. The order-acceptance management server 11 transmits the order-acceptance information to the logistics management server 17.

The logistics management server 17 having received the order-acceptance information from the order-acceptance management server 11 performs stock extraction based on a special-temperature shipping screen at step S415, to generate shipping information. The logistics management server 17 then transmits the shipping information to the delivery unit 15.

The delivery unit 15 having received the shipping information from the logistics management server 17 reads the bar-code indicating the lot number, the expiration date, and the serial number of the articles and inputs the information to the PC 25 at step S420, and transmits the information to the order-acceptance management server 11 via the wireless router 23.

Figure 9:
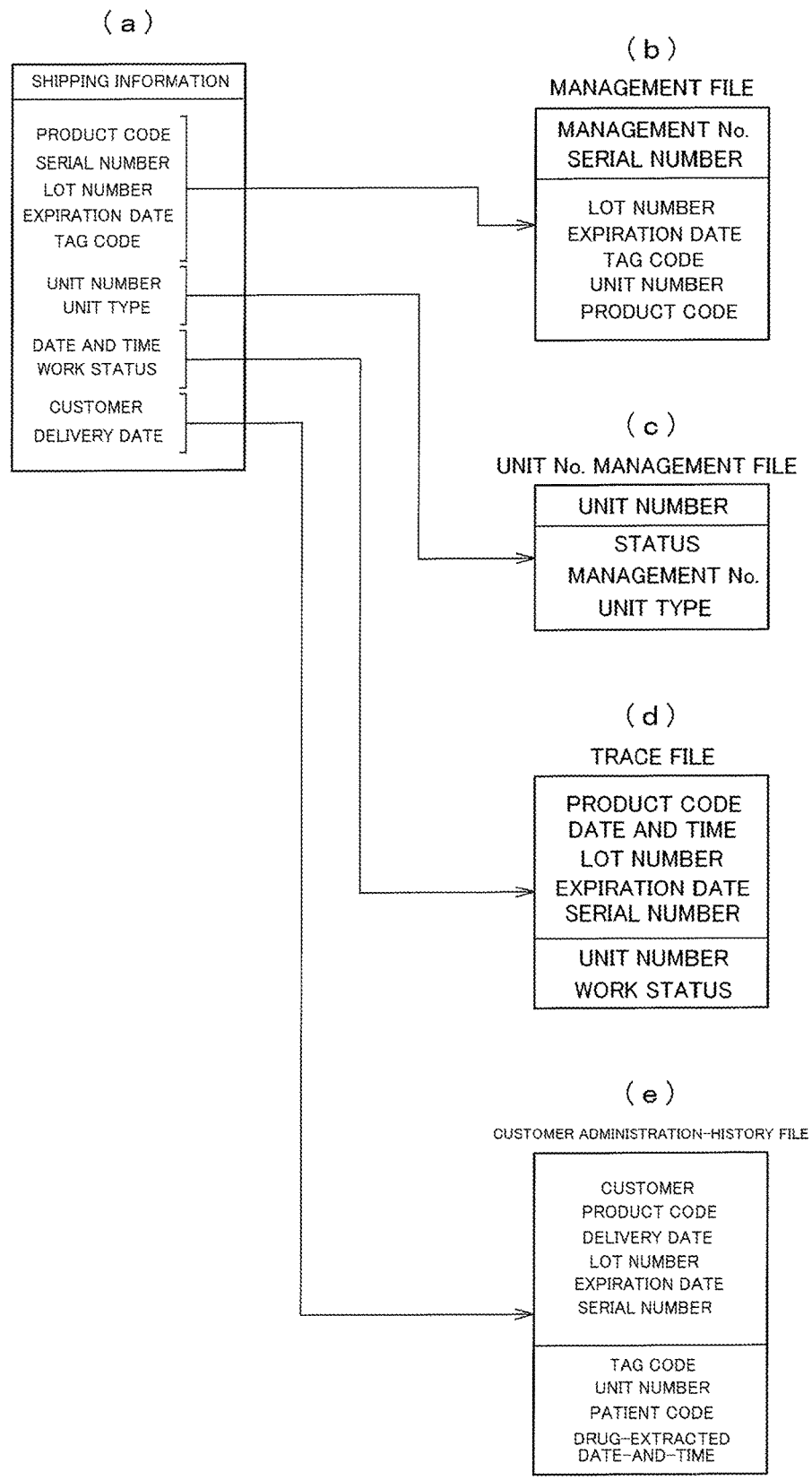
FIGS. 9(a) to (e) are diagrams illustrating association in a shipping-information association file according to the first embodiment of the present invention.

At step S425, the order-acceptance management server 11 associates the pieces of shipping information (a lot number, an expiration date, a serial number, a tag information, and the like) with each other received from the delivery unit 15, to generate a management file, a unit-No. management file, a trace file, and a customer administration-history file associated with the shipping information (FIG. 9). The order-acceptance management server 11 then transmits a monitoring start instruction to the delivery unit 15.

In the warehouse P3, at step S430, upon reception of the monitoring start instruction from the order-acceptance management server 11, the delivery unit 15 starts a monitoring operation. That is, the PC 25 receives measurement data from the sensors Se1 to Se7 recorded on the internal RAM of the data logger 39, and records the measurement data in the internal RAM of the PC 25. The recorded data is transmitted to the order-acceptance management server 11 via the network N2.

At step S435, the delivery unit 15 mounted on the vehicle starts delivery of articles from the warehouse P3*n* to the delivery destination P5.

When the articles arrive at the delivery destination P5 from the warehouse P3*n*, an 'EXECUTE' button B11 on a monitoring/status screen (FIG. 12(*b*)) is pressed and the delivery destination is input to the place, the delivery is completed. At step S440, the PC 25 in the delivery unit 15 displays a menu screen including a 'DISPLAY MONITORING/STATUS' button B9 (FIG. 12(*a*)).

At step S445, when the 'DISPLAY MONITORING/STATUS' button B9 is pressed on the screen of the PC 25, a status screen including a 'PRINT TEMPERATURE TRACE TABLE' button B17 is displayed (FIG. 12(*b*)). When the 'PRINT TEMPERATURE TRACE TABLE' button B17 is pressed, a print-range designation screen including a 'PRINT' button B21 is displayed (FIG. 14), and further, when the 'PRINT' button B21 is pressed, a quality certificate is printed (FIG. 15).

After a pharmaceutical product as an example of the article is administered, at step S450, the PC 25 displays a menu screen including an 'OPERATION IN MEDICAL INSTITUTION' button B7 (FIG. 12(*a*)). When the 'OPERATION IN MEDICAL INSTITUTION' button B7 is pressed on the screen of the PC 25, a medical-institution operation screen 101 (FIG. 13) is displayed to generate administration information. The PC 25 in the delivery unit 15 transmits the administration information to the order-acceptance management server 11.

In the warehouse P3*n*, at step S455, the order-acceptance management server 11 having received the administration information from the delivery unit 15 reflects the administration information on the trace file (FIG. 10) and the customer administration-history file (FIG. 10). The order-acceptance management server 11 generates a collection instruction of the delivery unit 15 and transmits the instruction to the PC 25 in the delivery unit 15.

At the delivery destination P5, at step S460, the PC 25 in the delivery unit 15 displays the collection instruction of the delivery unit 15 on the screen. In response thereto, the delivery unit 15 is mounted on the vehicle 21, to deliver the delivery unit 15 to the warehouse P3*n*.

In the warehouse P3*n*, at step S465, the delivery unit 15 is stored at a predetermined position in the warehouse P3*n*.

<Shipping-Information Association File>

FIGS. 9(*a*) to (*e*) are diagrams illustrating association in a shipping-information association file according to the first embodiment of the present invention.

The shipping information (FIG. 9(*a*)) transmitted from the delivery unit 15 to the order-acceptance management server 11 includes a product code, a serial number, a lot number, an expiration date, a tag code, a unit number, a unit type, a date and time, a work status, a customer, and a delivery date, and these pieces of data are memorized in the database DB 13.

The order-acceptance management server 11 extracts the lot number, the expiration date, the tag code, the unit number, and the product code from the shipping information (FIG. 9(*a*)) by using the serial number as a key, generates a management file (FIG. 9(*b*)) in which these pieces of data are associated with each other, and memorizes the management file in the database DB 13.

The order-acceptance management server 11 extracts the status, the management No., and the unit type from the shipping information (FIG. 9(*a*)) by using the unit number as a key, updates the unit number management file (FIG. 7(*c*)) in which these pieces of data are associated with each other, and memorizes the management file in the database DB 13.

The order-acceptance management server 11 extracts the unit number and the work status from the shipping information (FIG. 9(*a*)) by using the product code, the date and time, the lot number, the expiration date, and the serial number as a key, generates a trace file (FIG. 9(*d*)) in which these pieces of data are associated with each other, and memorizes the trace file in the database DB 13.

The order-acceptance management server 11 extracts the customer and the delivery date from the shipping information (FIG. 9(*a*)) by using the serial number as a key, and adds these pieces of data to the customer administration-history file, to update the customer administration-history file (FIG. 9(e)), in which the customer, the product code, the delivery date, the lot number, the expiration date, the serial number, the tag code, the unit number, a patient code, and a drug-extracted date-and-time are memorized.

<Administration-Information Association File>

FIGS. 10(a) to (c) are diagrams illustrating association in an administration-information association file according to the first embodiment of the present invention.

Administration information (FIG. 10(a)) transmitted from the delivery unit 15 to the order-acceptance management server 11 includes a customer, a product code, a delivery date, a lot number, an expiration date, a serial number, a patient code, a drug-extracted date-and-time, a unit number, a date and time, and a work status, and these pieces of data are memorized in the database DB 13.

The order-acceptance management server 11 extracts the customer, the product code, the delivery date, the lot number, the expiration date, the serial number, the patient code, and the drug-extracted date-and-time from the administration information (FIG. 10(a)) by using the serial number as a key, updates the customer administration-history file (FIG. 9(e)) in which these pieces of data are associated with each other, and memorizes the updated customer administration-history file in the database DB 13.

The order-acceptance management server 11 extracts the unit number, the date and time, and the work status from the administration file (FIG. 10(a)) by using the serial number as a key, generates a trace file (FIG. 10(c)) in which these pieces of data are associated with each other, and memorizes the trace file in the database DB 13.

<Status Monitoring Process>

Figure 11A:
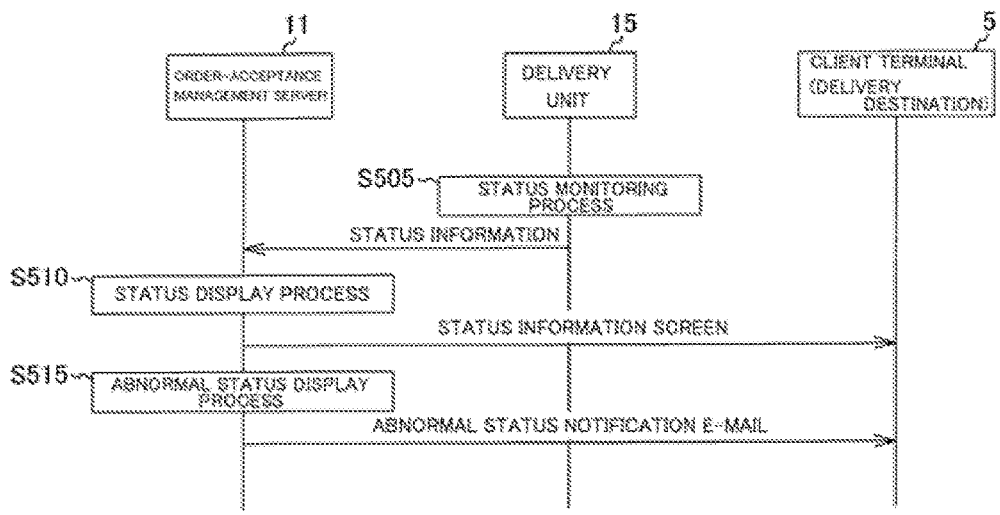
FIG. 11A is a sequence diagram of a status monitoring process by the delivery system according to the first embodiment of the present invention.

FIG. 11(a) is a sequence diagram of a status monitoring process by the delivery system 1 according to the first embodiment of the present invention.

At step S505, the PC 25 in the delivery unit 15 performs a status monitoring process for monitoring status information representing a phase, a place, a sequence, and contents of the delivery unit to generate status information, and transmits the status information to the order-acceptance management server 11.

At step S510, the order-acceptance management server 11 generates a status information screen by performing a status display process based on the phase, the place, the sequence, and the contents of the delivery unit included in the status information received from the delivery unit 15, and transmits the status information screen to the client terminal 5 at the delivery destination.

At step S515, when an abnormal state is included in the phase, the place, the sequence, and the contents of the delivery unit included in the status information received from the delivery unit 15, the order-acceptance management server 11 generates a status-abnormality notification e-mail by performing a status-abnormality display process, and transmits the status-abnormality notification e-mail to the client terminal 5 at the delivery destination.

The PC 25 in the delivery unit 15 transmits the status information to the order-acceptance management server 11. The status information can be referred to by the client terminal 5 at the delivery destination. Further, the e-mail notification is transmitted to the client terminal 5 at the delivery destination.

<Quality Certificate Printing Sequence>

Figure 11B:
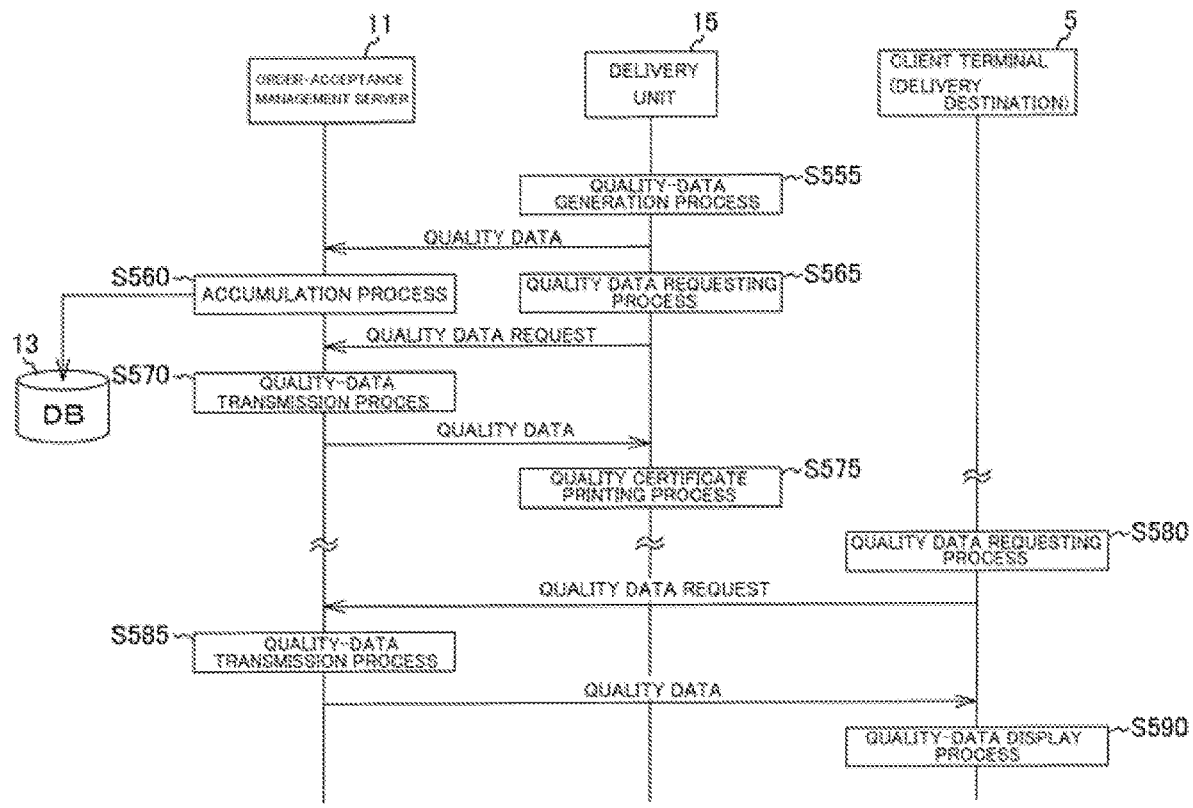
FIG. 11B is a sequence diagram of a quality certificate printing sequence performed by the delivery system according to the first embodiment of the present invention.

FIG. 11(b) is a sequence diagram of a quality certificate printing sequence performed by the delivery system 1 according to the first embodiment of the present invention.

At step S555, the first transmission unit 55c of the delivery unit 15 transmits quality data generated by performing a quality-data generation process to the order-acceptance management server 11.

At step S560, the second reception unit 11b of the order-acceptance management server 11 receives the quality data from the delivery unit 15, and accumulates the quality data in the database DB 13 by performing an accumulation process.

At step S565, the second transmission unit 55d of the delivery unit 15 transmits a quality data request for requesting quality data to the order-acceptance management server 11 by performing a quality data requesting process as needed.

At step S570, upon reception of the quality data request from the delivery unit 15, the third transmission unit 11a of the order-acceptance management server 11 transmits the quality data acquired from the database DB 13 to the delivery unit 15 by performing a quality data transmission process.

At step S575, the first reception unit 55e of the delivery unit 15 receives the quality data from the order-acceptance management server 11 and prints a quality certificate by performing a print-data editing process.

The fifth transmission unit 5a of the client terminal 5 transmits a quality data request to the order-acceptance management server 11 by performing the quality data requesting process as needed.

When the order-acceptance management server 11 receives a quality data request from the client terminal 5, the fourth transmission unit 11c of the order-acceptance management server 11 transmits the quality data acquired from the database DB 13 to the client terminal 5.

The third reception unit 5b of the client terminal 5 receives the quality data from the order-acceptance management server 11, edits the quality data to create a graphic diagram by performing a quality-data display process, and displays the graphic diagram on the operation display UNIT 25d.

<Menu Screen>

Figure 12A:
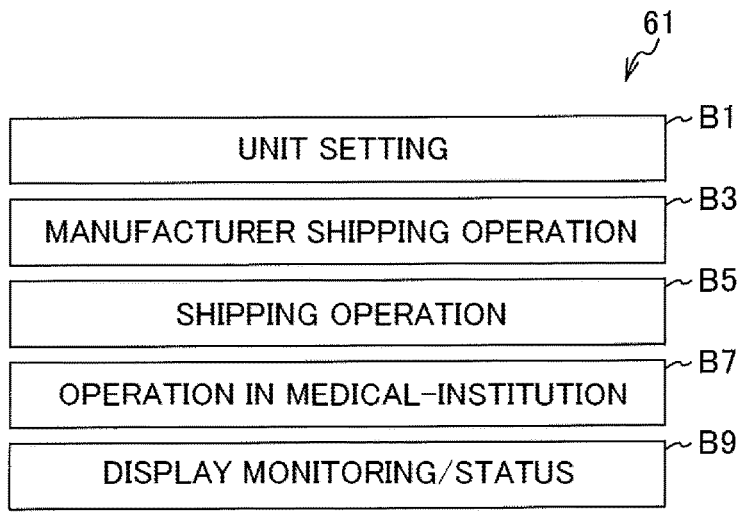
FIG. 12A is a diagram illustrating an example of a menu screen displayed on a PC in the delivery unit according to the first embodiment of the present invention.

FIG. 12(a) is a diagram illustrating an example of a menu screen displayed on the PC in the delivery unit according to the first embodiment of the present invention.

As illustrated in FIG. 12(a), a 'UNIT SETTING' button B1, a 'MANUFACTURER SHIPPING OPERATION' button B3, a 'SHIPPING OPERATION' button B5, the 'OPERATION IN MEDICAL-INSTITUTION' button B7, and the 'DISPLAY MONITORING/STATUS' button B9 are displayed on the PC 25 in the delivery unit 15 as a menu screen 61.

<Monitoring/Status Display Screen>

Figure 12B:
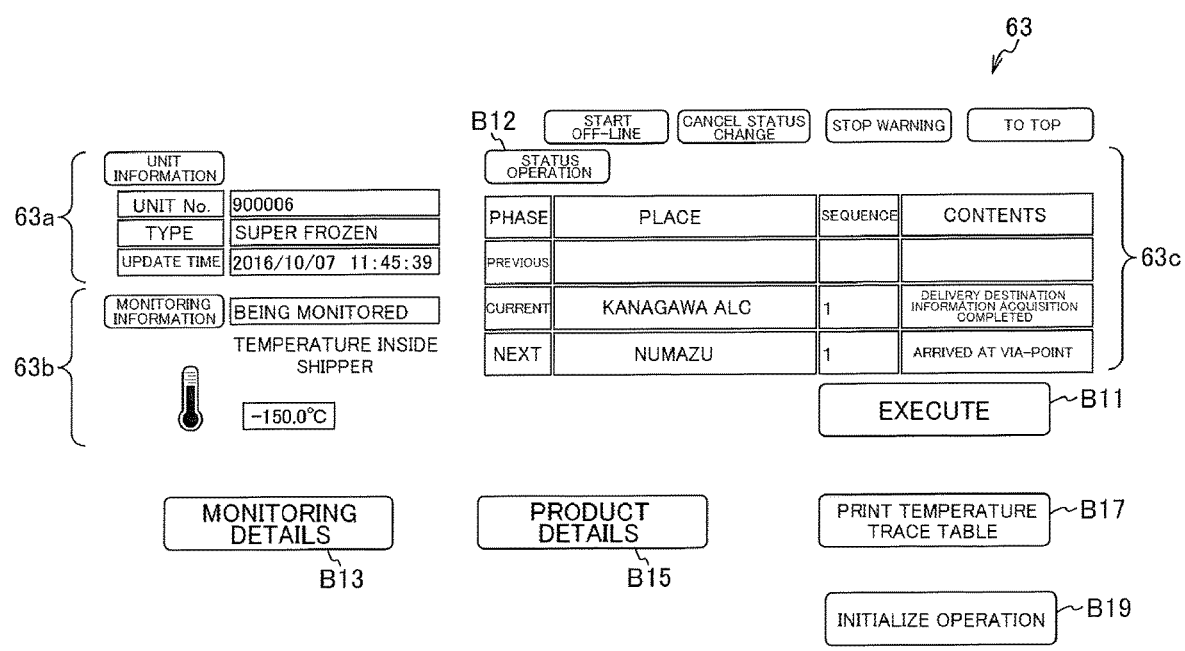
FIG. 12B is a diagram illustrating a monitoring/status display screen displayed on the PC in the delivery unit according to the first embodiment of the present invention.

FIG. 12(b) is a diagram illustrating a monitoring/status display screen displayed on the PC in the delivery unit according to the first embodiment of the present invention.

In the PC 25, when the 'DISPLAY MONITORING/ STATUS' button B9 illustrated in FIG. 12(a) is pressed, a monitoring/status display screen 63 illustrated in FIG. 12(b) is displayed.

On the monitoring/status display screen 63, a unit No., a type, an update time, and a temperature in the storage container 33 (temperature in a shipper) 63b as monitoring information are displayed as unit information 63a.

On the monitoring/status display screen 63, a phase, a place, a sequence, and contents are displayed as a status operation, and the 'EXECUTE' button B11 is also displayed.

Further, in a lower part of the monitoring/status display screen 63, a 'MONITORING DETAILS' button B13, a 'PRODUCT DETAILS' button B15, a 'PRINT TEMPERATURE TRACE TABLE' button B17, and an 'INITIALIZE OPERATION' button B19 are displayed.

<Medical-Institution Operation Screen>

Figures 13A, 13B:
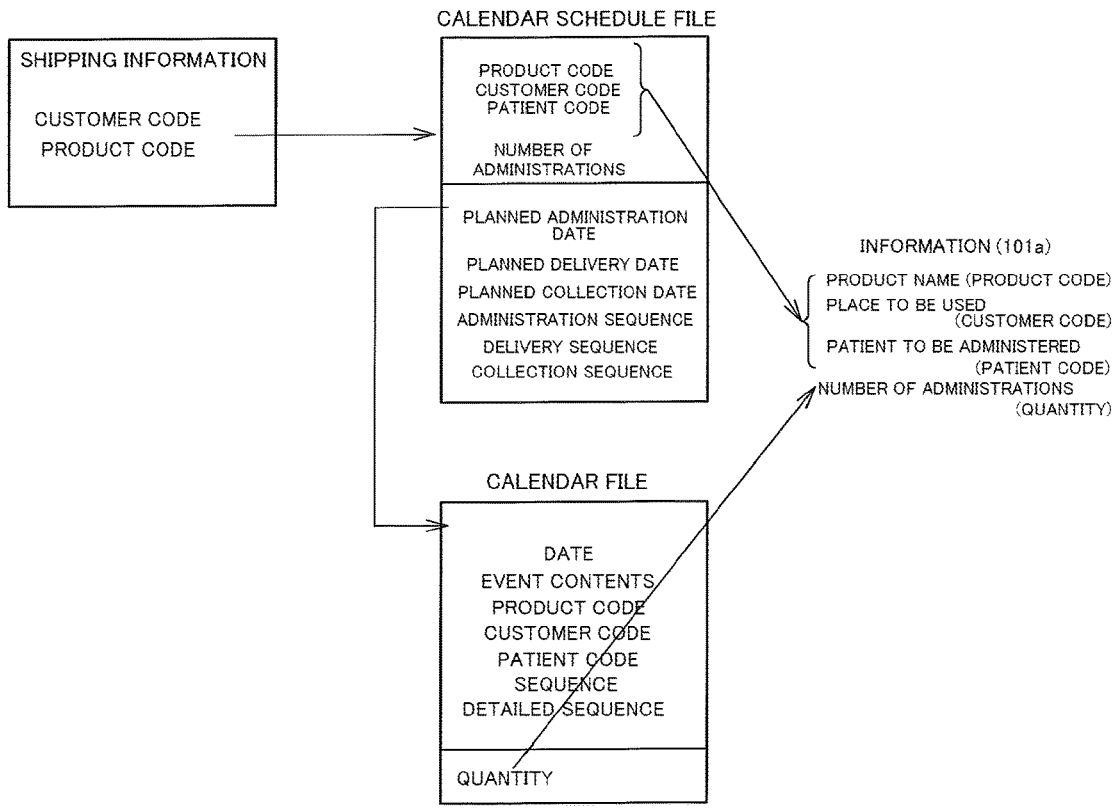
FIG. 13A is a diagram illustrating a medical-institution operation screen according to the first embodiment of the present invention.
FIG. 13B is a diagram illustrating association in a calendar file according to the first embodiment of the present invention.

FIG. 13(*a*) is a diagram illustrating a medical-institution operation screen according to the first embodiment of the present invention.

A medical-institution operation screen 101 illustrated in FIG. 13(*a*) can be displayed on the client terminal 5 at the delivery destination.

On the medical-institution operation screen 101, a product name, a temperature in the storage container 33 (a temperature in a shipper), a patient to be administered, a place to be used, a measurement date-and-time, and the number of administrations are displayed as information representing a part of a calendar file and information 101*a* of the delivery unit 15.

On the medical-institution operation screen 101, a tag code, a drug-extracted date-and-time, a patient code, a lot number, an expiration date, and a serial number are displayed on a horizontal axis, as information 101*b* representing a part of the customer administration-history file acquired from the order-acceptance management server 11, and a 'SELECT' button is displayed corresponding to each record.

Further, in a lower part of the medical-institution operation screen 101, a 'USE' button B101, and a 'CLOSE' button B105 are displayed.

FIG. 13(*b*) is a diagram illustrating association in a calendar file according to the first embodiment of the present invention.

The shipping information transmitted from the delivery unit 15 to the order-acceptance management server 11 includes a customer code and a product code as illustrated in FIG. 13(*b*), and these pieces of data are memorized in the database DB 13.

Meanwhile, a calendar schedule file includes a product code, a customer code, a patient code, the number of administrations, a planned administration date, a planned delivery date, a planned collection date, an administration sequence, a delivery sequence, and a collection sequence, and these pieces of data are memorized in the database DB 13.

Further, the calendar file includes a date, event contents, a product code, a customer code, a patient code, a sequence, a detailed sequence, and a quantity, and these pieces of data are memorized in the database DB 13.

The order-acceptance management server 11 extracts the product code, the customer code, the patient code, and the planned administration date from the calendar schedule file by using the customer code and the product code as a key, and extracts the quantity from the calendar file by using the planned administration date as a key, and these pieces of data are displayed as the information 101*a* on the medical-institution operation screen 101 (FIG. 13(*a*)).

<Print-Range Designation Screen>

Figure 14:
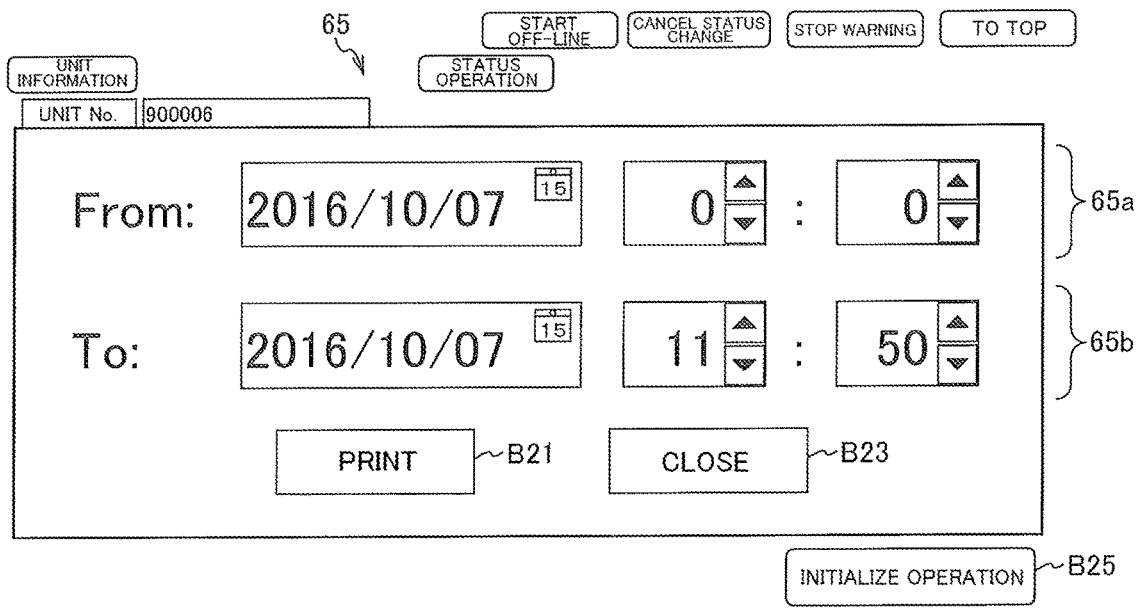
FIG. 14 is a diagram illustrating a print-range designation screen to be displayed on the PC in the delivery unit according to the first embodiment of the present invention.
Figure 15:
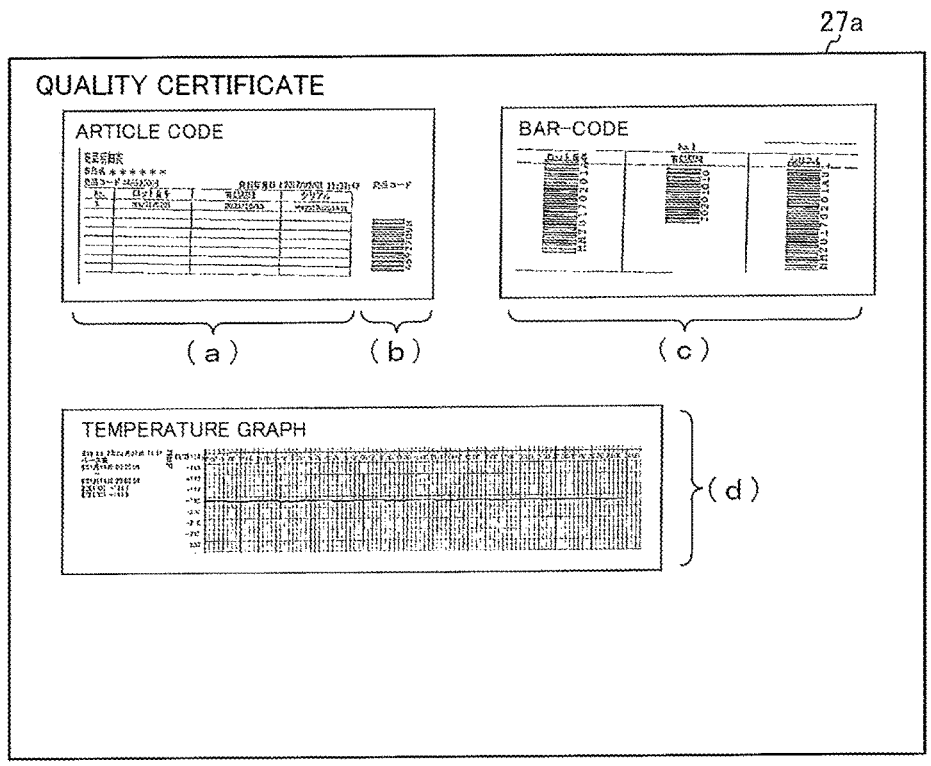
FIGS. 15(a) to (d) are diagrams illustrating respective parts in a quality certificate output from a printer of the delivery unit according to the first embodiment of the present invention.

FIG. 14 is a diagram illustrating a print-range designation screen to be displayed on the PC in the delivery unit according to the first embodiment of the present invention.

When the 'PRINT TEMPERATURE TRACE TABLE' button B17 illustrated in FIG. 12(*b*) is pressed, the print-range designation screen 65 illustrated in FIG. 14 is displayed.

On the print-range designation screen 65, a date-and-time box 65*a* for inputting a start date-and-time, a date-and-time box 65*b* for inputting an end date-and-time, the 'PRINT' button B21, a 'CLOSE' button B23, and an 'INITIALIZE OPERATION' button B25 are displayed.

<Quality Certificate>

FIG. 15 are diagrams illustrating respective parts in a quality certificate output from the printer of the delivery unit according to the first embodiment of the present invention.

When the 'PRINT' button B21 included in the print-range designation screen 65 illustrated in FIG. 14 is pressed, a quality certificate 27*a* illustrated in FIG. 15 is printed.

As illustrated in FIG. 15, in the quality certificate 27*a*, a product code (b) such as a lot number, an expiration date, and a serial number, a bar-code (c) such as a lot number, an expiration date, and a serial number, and a temperature graph (d) are arranged as an article code.

<Association of Respective Files>

Figure 16:
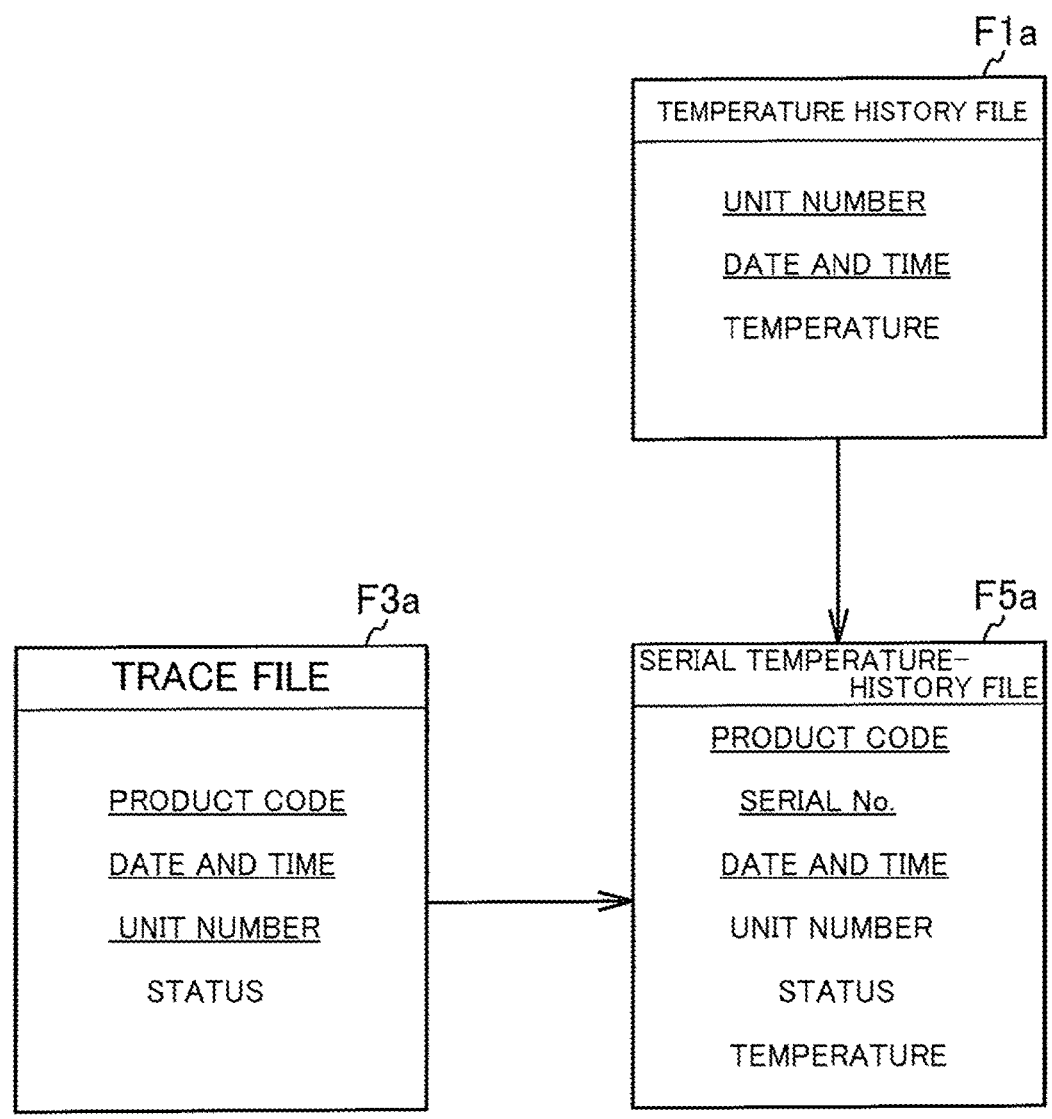
FIG. 16 is a diagram illustrating association of respective files according to the first embodiment of the present invention.

FIG. 16 is a diagram illustrating association of respective files according to the first embodiment of the present invention.

The order-acceptance management server 11 acquires temperature data from the data logger 39 provided in the delivery unit 15, and adds the unit number and the date and time to the temperature data, to generate a temperature history file F1.

The order-acceptance management server 11 acquires status information updated by the PC 25 in the delivery unit 15, to generate a trace file F3 in which the product code, the date and time, the serial number, the unit number, and the status are associated with each other, as status information.

The order-acceptance management server 11 uses the unit number included in the trace file F3 as a key, extracts temperature data from the temperature history file F1 having the key, to generate a serial temperature-history file F5, and memorizes the serial temperature-history file F5 in the database DB 13.

<Print-Data Editing Process>

Figure 17:
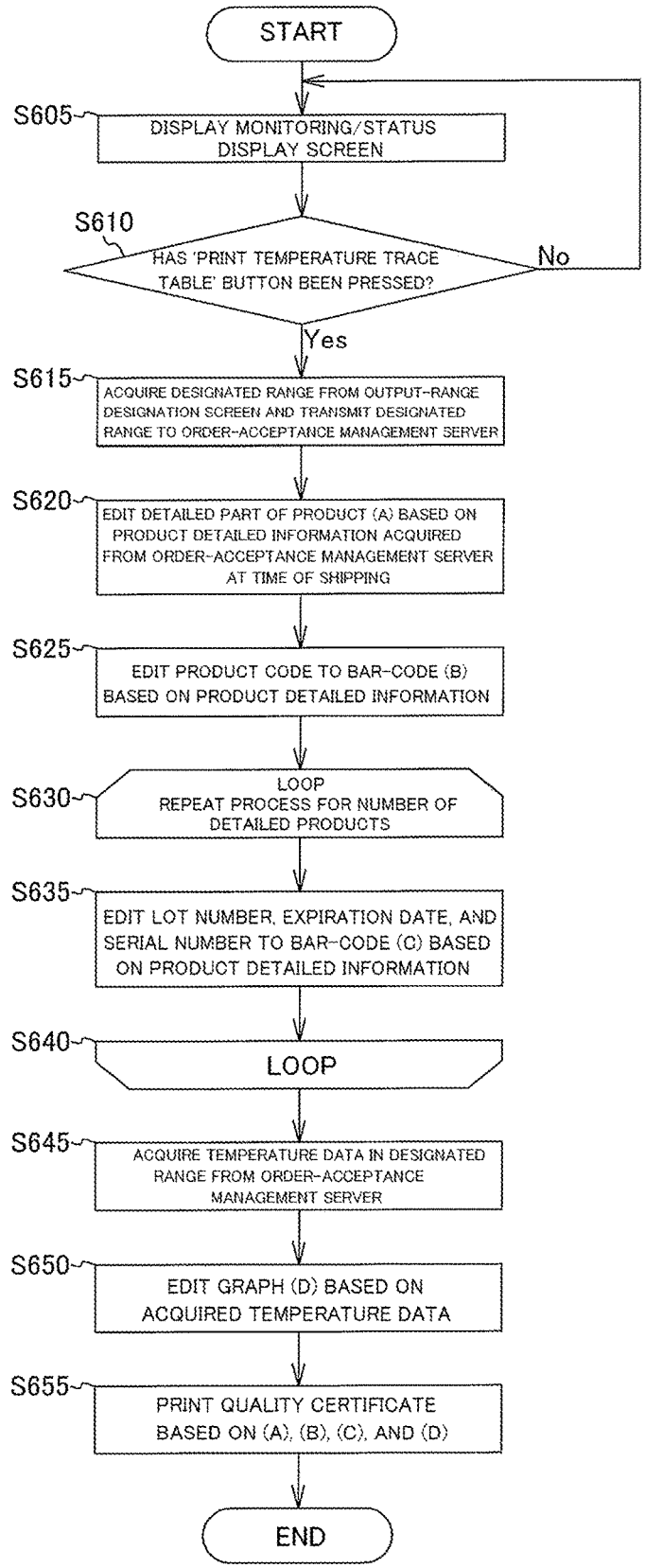
FIG. 17 is a flowchart illustrating a print-data editing process performed by the PC in the delivery unit according to the first embodiment of the present invention.

FIG. 17 is a flowchart illustrating a print-data editing process performed by the PC in the delivery unit according to the first embodiment of the present invention.

At step S605, the PC 25 in the delivery unit 15 displays the monitoring/status display screen (FIG. 12(*b*)).

At step S610, the PC 25 determines whether a user has pressed the 'PRINT TEMPERATURE TRACE TABLE' button B117 (FIG. 12(*b*)). When determining that the user has pressed the 'PRINT TEMPERATURE TRACE TABLE' button B117, the PC 25 proceeds to Step S615, or when determining that the user has not pressed the 'PRINT TEMPERATURE TRACE TABLE' button B17, the PC 25 returns to Step S610.

At step S615, the PC 25 displays the print-range designation screen 65 (FIG. 14), acquires a designated range from the print-range designation screen 65, and transmits the designated range to the order-acceptance management server 11.

At this time, it is assumed that when the print-range designation screen 65 (FIG. 14) is displayed, the user has input the start date-and-time in the date-and-time box 65*a*, input the end date-and-time in the date-and-time box 65*b*, and pushed the 'PRINT' button B21.

At step S620, the PC 25 edits a detailed part of the product (A) (FIG. 15(*a*)) based on product detailed information acquired from the order-acceptance management server 11 at the time of shipping.

At step S625, the PC 25 edits the product code to generate a bar-code (B) (FIG. 15(*b*)) based on the product detailed information.

At step S630, the PC 25 repeats the process for the number of detailed products as a loop process.

At step S635, the PC 25 edits the lot, the expiration date, and the serial number to generate bar-codes (C) (FIG. 15(c)) based on the product detailed information.

At step S640, after having repeated the process for the number of detailed products, the PC 25 ends the loop process to proceed to Step S645.

At step S645, the PC 25 acquires temperature data in the designated range from the order-acceptance management server 11. At this time, the second transmission unit 55d of the delivery unit 15 transmits a quality data request for requesting quality data to the order-acceptance management server 11 by performing a quality data requesting process as needed, to acquire temperature data being the quality data from the database DB 13 via the order-acceptance management server 11 into the delivery unit 15.

At step S645, the PC 25 may acquire the temperature data being the quality data from the data logger 39 by enlarging a memory capacity of the data logger 39, instead of acquiring the temperature data being the quality data from the database DB 13 via the order-acceptance management server 11.

At step S650, the PC 25 edits a graph (FIG. 15(d)) (D) based on the acquired temperature data.

At step S655, the PC 25 edits the quality certificate data based on the edited pieces of data (A), (B), (C), and (D), and supplies the quality certificate data to the printer 27, to print the quality certificate 27a (FIG. 15) by the printer 27.

<Product Detailed-Information File>

Figure 18:
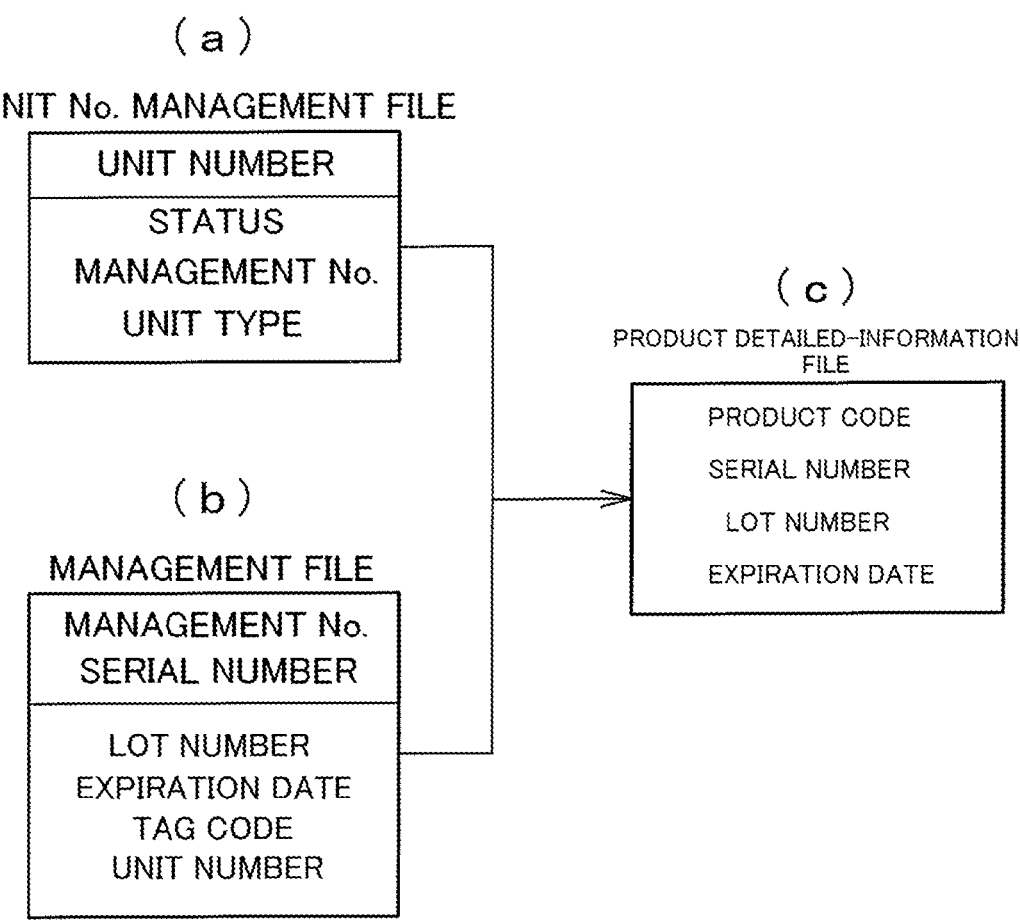
FIGS. 18(a) to (c) are diagrams illustrating association in a product detailed-information file according to the first embodiment of the present invention.

FIGS. 18(a) to (c) are diagrams illustrating association in a product detailed-information file according to the first embodiment of the present invention.

The order-acceptance management server 11 extracts a status, a management No., and a unit type from the shipping information (FIG. 7(a)) by using the unit number as a key, to generate a unit-number management file (FIG. 18(a)) in which these pieces of data are associated with each other, and memorizes the unit-number management file in the database DB 13.

The order-acceptance management server 11 extracts the lot number, the expiration date, the tag code, the unit number, and the product code from the shipping information (FIG. 7(a)) by using the serial number as a key, to generate a management file (FIG. 18(b)) in which these pieces of data are associated with each other, and memorizes the management file in the database DB 13.

The order-acceptance management server 11 acquires the product detailed-information file from the database at the time of shipping, and transmits the product detailed-information file to the delivery unit 15. That is, the order-acceptance management server 11 uses a unit number as a key to extract the status, the management No., and the unit type from the unit-number management file having the key, and extracts the lot number, the expiration date, the tag code, and the unit number using the management No. and the serial number as keys from the management file in the similar manner, to generate a product detailed-information file (FIG. 18(c)) in which these pieces of data are associated with each other, and memorizes the product detailed-information file in the database DB 13 and also transmits the product detailed-information file to the delivery unit 15.

According to the present embodiment, print data relating to a quality certificate including a graphic image representing the quality in chronological order of a cooling environment in the storage container 33 accommodating articles therein during delivery is edited based on a serial number of the article and quality data and is printed on a recording medium, to create the quality certificate 27a, thereby enabling to issue the quality certificate 27a. Accordingly, at a delivery destination, the quality in chronological order of a cooling environment in the container can be confirmed immediately at the site, upon reception of the container that accommodates the articles therein.

According to the present embodiment, the quality-data generation unit 55a generates quality data of the articles based on temperature data acquired from the memory unit 53 corresponding to a printing date-and-time range acquired by the print-range acquisition unit 55g. Therefore, the quality-data generation unit 55a can issue the quality certificate 27a including the graphic image representing the quality in chronological order in the range designated in the printing date-and-time range. Accordingly, at a delivery destination, the quality in chronological order of a cooling environment in the container can be confirmed immediately at the site, upon reception of the container that accommodates the articles therein.

According to the present embodiment, since the printer 27 prints an image including at least one of a lot number and a serial number of an article, or an expiration date of the article in addition to the serial number of the article on a recording medium, the quality certificate 27a associated with a specific article can be issued.

According to the present embodiment, the delivery unit 15 prints on a recording medium a graphic image representing the quality in chronological order of a cooling environment in the storage container 33 that accommodates articles therein during delivery, based on the quality data received from the order-acceptance management server 11, to create the quality certificate 27a, thereby enabling to issue the quality certificate 27a. Therefore, at a delivery destination, the quality in chronological order of the cooling environment in the container can be confirmed immediately at the site, upon reception of the container that accommodates the articles therein.

According to the present embodiment, the client terminal 5 can confirm the quality in chronological order of the cooling environment in the storage container 33 that accommodates the articles therein during delivery, based on the quality data received from the order-acceptance management server 11.

Second Embodiment

A delivery unit according to a second embodiment of the present invention is described with reference to FIG. 19 to FIG. 21. Among the reference signs in FIG. 19 to FIG. 21, elements same as those denoted by reference signs in FIG. 15 to FIG. 17 have the same configuration as those illustrated in FIG. 15 to FIG. 17, and thus descriptions thereof are omitted.

<Quality Certificate Including Liquid Level Data>

Figure 19:
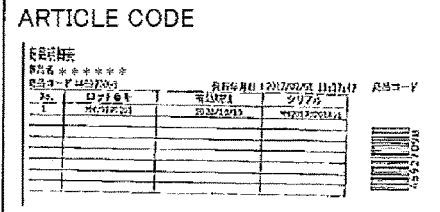
FIGS. 19(a) to (e) are diagrams illustrating respective parts in a quality certificate printed by a printer of a delivery unit according to a second embodiment of the present invention.

FIG. 19 are diagrams illustrating respective parts in a quality certificate printed by a printer of the delivery unit according to the second embodiment of the present invention.

When the 'PRINT' button B21 included in the print-range designation screen 65 illustrated in FIG. 14 is pressed, a quality certificate 27b illustrated in FIG. 19 is printed.

As illustrated in FIG. 19, in the quality certificate 27b, a product code (b) such as a lot number, an expiration date, and a serial number, a bar-code (c) such as a lot number, an expiration date, and a serial number, a temperature graph (d), and a liquid level graph (e) are arranged as an article code.

<Association of Respective Files>

Figure 20:
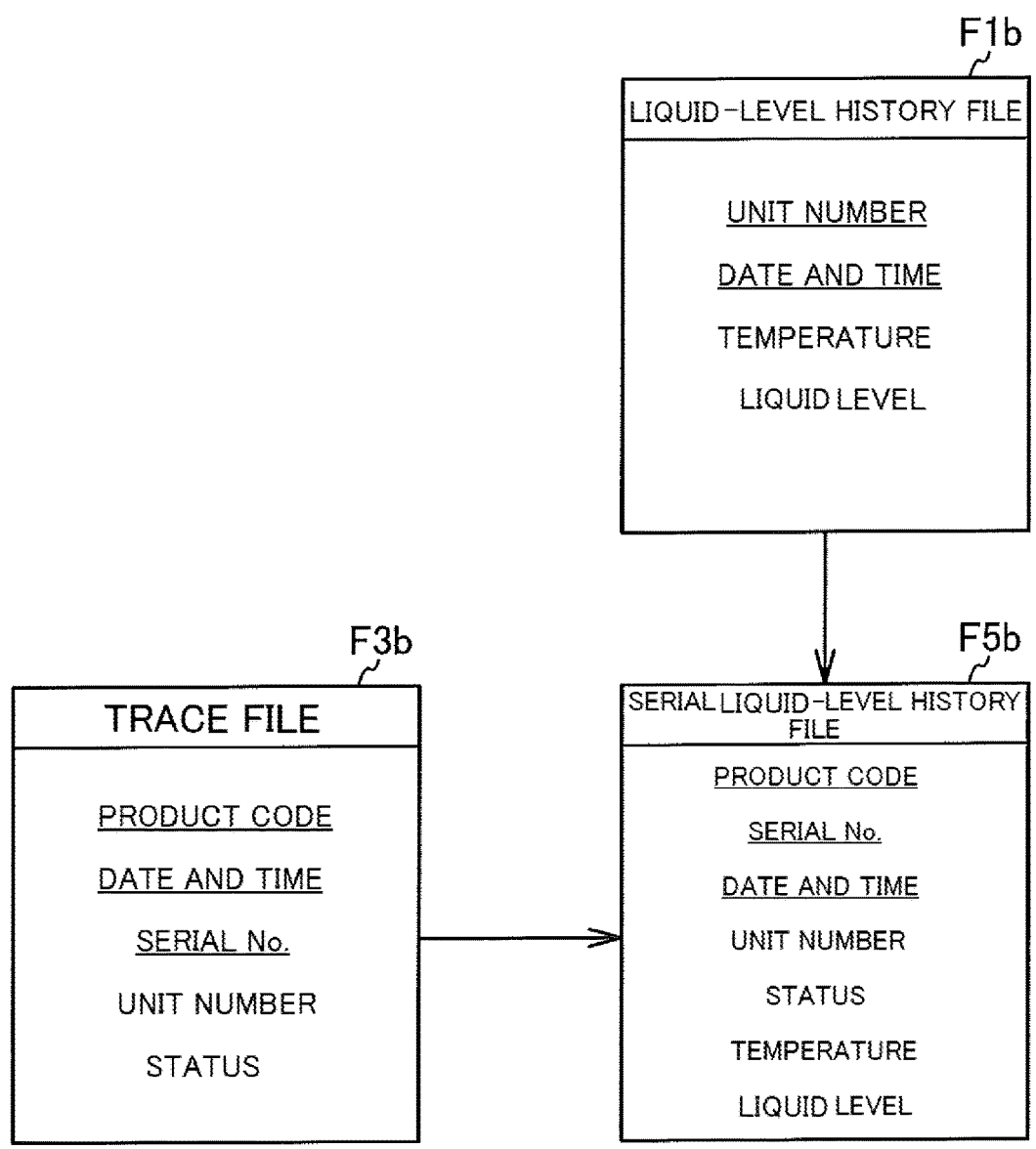
FIG. 20 is a diagram illustrating association of respective files according to the second embodiment of the present invention.

FIG. 20 is a diagram illustrating association of respective files according to the second embodiment of the present invention.

The order-acceptance management server 11 acquires temperature data and liquid level data from the data logger 39 provided in the delivery unit 15, adds a unit number and a date and time to the temperature data, to generate a liquid-level history file F1.

The order-acceptance management server 11 acquires status information updated by the PC 25 of the delivery unit 15, to generate a trace file F3 in which a product code, a date and time, a serial number, a unit number, and a status are associated with each other, as status information.

The order-acceptance management server 11 uses the unit number included in the trace file F3 as a key to extract the temperature data and the liquid level data from the liquid-level history file F1 having these keys to generate a serial liquid-level history file F5, and memorizes the serial liquid-level history file F5 in the database DB 13.

<Print-Data Editing Process>

Figure 21:
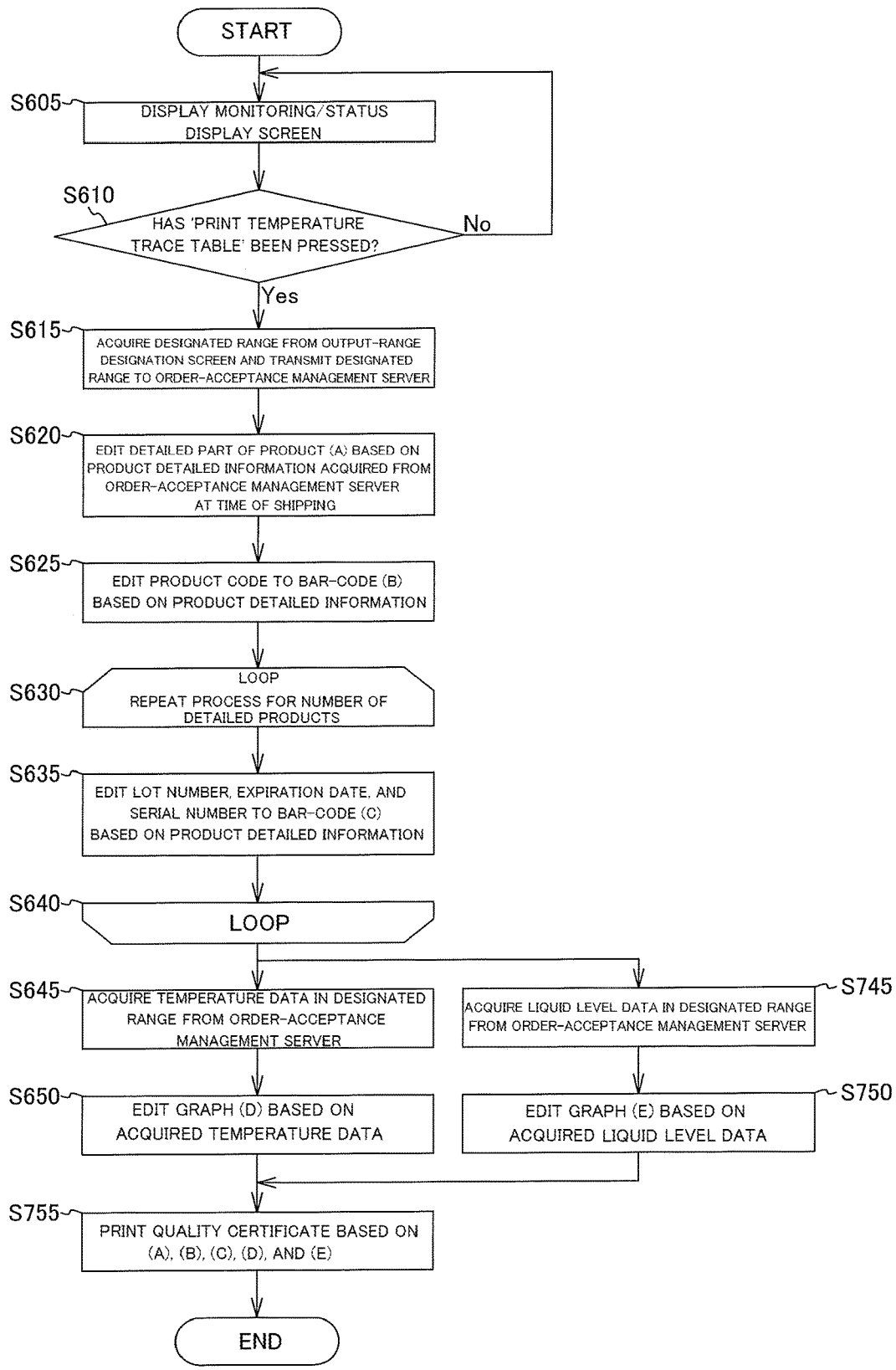
FIG. 21 is a flowchart illustrating a print-data editing process performed by a PC in the delivery unit according to the second embodiment of the present invention.

FIG. 21 is a flowchart illustrating a print-data editing process performed by the PC in the delivery unit according to the second embodiment of the present invention.

At step S745, the PC 25 acquires liquid level data in a designated range from the order-acceptance management server 11. At this time, the second transmission unit 55d of the delivery unit 15 transmits a quality data request for requesting quality data to the order-acceptance management server 11 by performing the quality data requesting process as needed.

At step S750, the PC 25 edits a graph (FIG. 19(e)) (E) based on the acquired liquid level data.

At step S755, the PC 25 edits the quality certificate data based on the edited pieces of data (A), (B), (C), (D), and (E) and supplies the quality certificate data to the printer 27, to print the quality certificate 27b (FIG. 19) by the printer 27.

According to the present embodiment, since the quality-data generation unit 55a generates quality data of articles based on liquid level data acquired from the memory unit 53, the quality certificate 27a including a graphic image representing the quality of the liquid level data of a cooling gas in chronological order can be issued. Therefore, at a delivery destination, upon reception of a container that accommodates articles therein, the liquid level quality of a cooling gas in chronological order relating to a cooling environment in the container can be confirmed immediately at the site.

According to the present embodiment, since the quality-data generation unit 55a adds a graph representing the liquid level of a cooling gas to the quality data, based on the liquid level data acquired from the memory unit 53, the quality certificate 27b including a graphic image representing the liquid level of the cooling gas in chronological order can be issued.

According to the present embodiment, since the printer 27 prints an image including at least one of a lot number and a serial number of an article, or an expiration date of the article in addition to a serial number of the article on a recording medium, the quality certificate 27b associated with a specific article can be issued.

Third Embodiment

A delivery unit according to a third embodiment of the present invention is described with reference to FIG. 22 to FIG. 24. Among the reference signs in FIG. 22 to FIG. 24, elements same as those denoted by reference signs in FIG. 15 to FIG. 17 have the same configuration as those illustrated in FIG. 15 to FIG. 17, and thus descriptions thereof are omitted.

<Quality Certificate Including Vibration Data>

Figure 22:
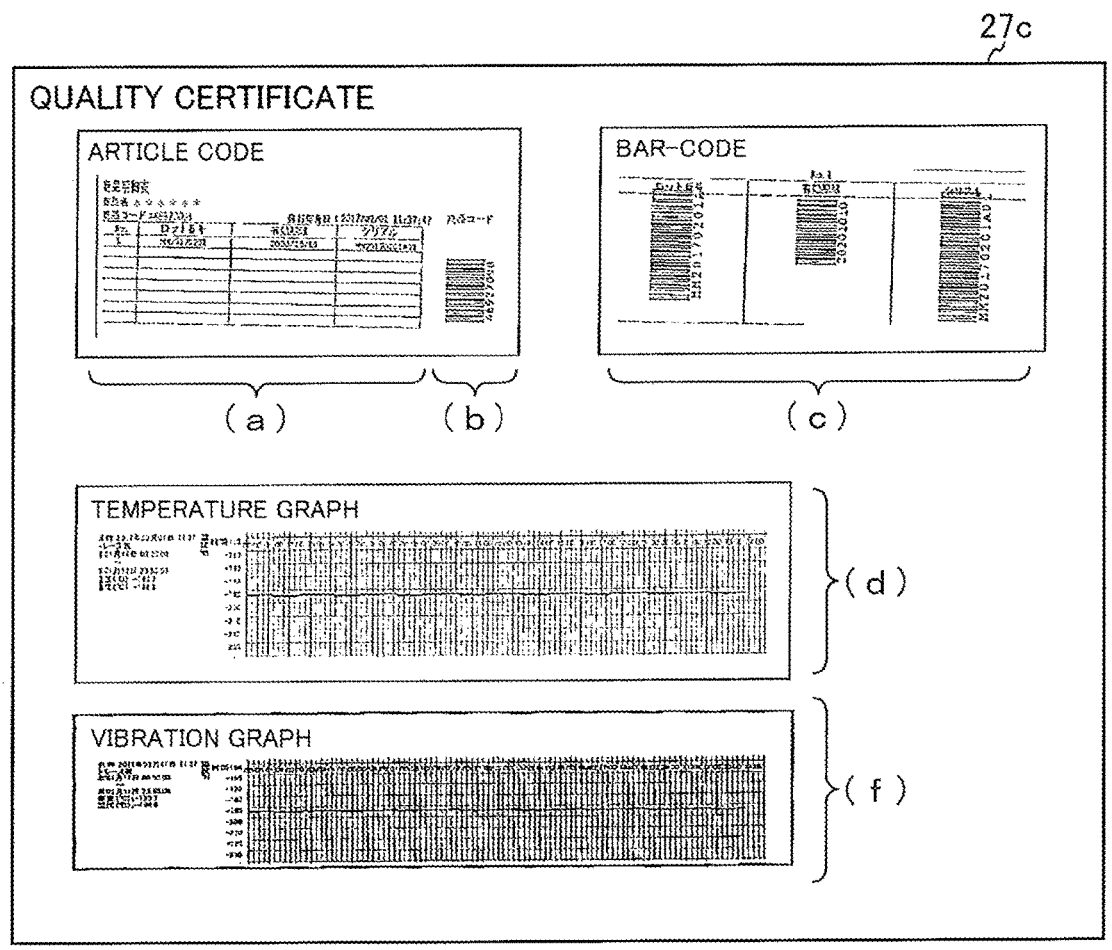
FIGS. 22(a) to (f) are diagrams illustrating respective parts in a quality certificate printed by a printer of a delivery unit according to a third embodiment of the present invention.

FIG. 22 are diagrams illustrating respective parts in a quality certificate printed by a printer of the delivery unit according to the third embodiment of the present invention.

When the 'PRINT' button B21 included in the print-range designation screen 65 illustrated in FIG. 14 is pressed, a quality certificate 27c illustrated in FIG. 22 is printed.

As illustrated in FIG. 22, in the quality certificate 27c, a product code (b) such as a lot number, an expiration date, and a serial number, a bar-code (c) such as a lot number, an expiration date, and a serial number, a temperature graph (d), and a vibration graph (f) are arranged as an article code.

<Association of Respective Files>

Figure 23:
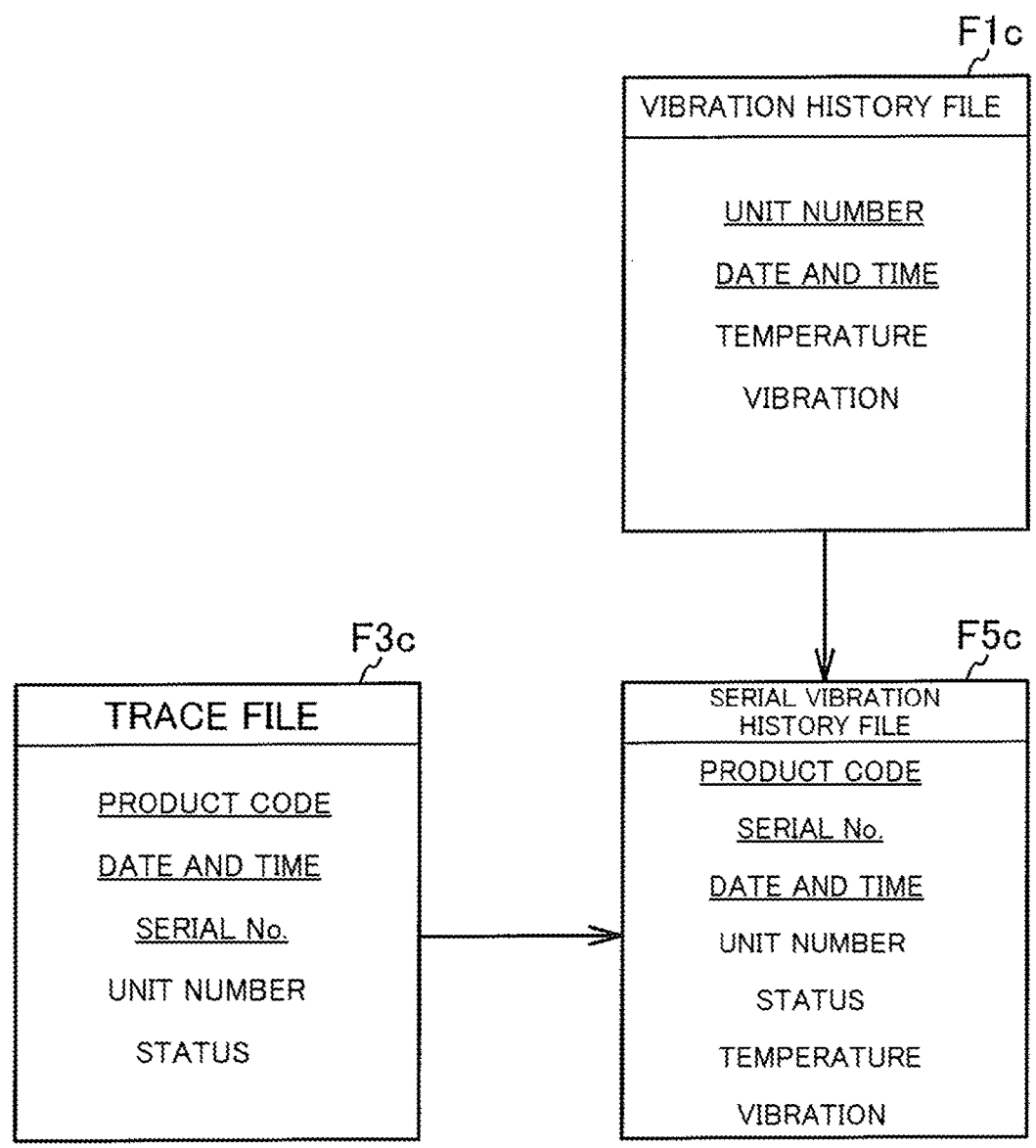
FIG. 23 is a diagram illustrating association of respective files according to the third embodiment of the present invention.

FIG. 23 is a diagram illustrating association of respective files according to the third embodiment of the present invention.

The order-acceptance management server 11 acquires temperature data and vibration data from the data logger 39 provided in the delivery unit 15, adds a unit number and a date and time to the temperature data, to generate a vibration history file F1.

The order-acceptance management server 11 acquires status information updated by the PC 25 of the delivery unit 15, to generate a trace file F3 in which a product code, a date and time, a serial number, a unit number, and a status are associated with each other, as status information.

The order-acceptance management server 11 uses the unit number included in the trace file F3 as a key to extract the temperature data and the vibration data from the vibration history file F1 having these keys to generate a serial vibration-history file F5, and memorizes the serial vibration-history file F5 in the database DB 13.

<Print-Data Editing Process>

Figure 24:
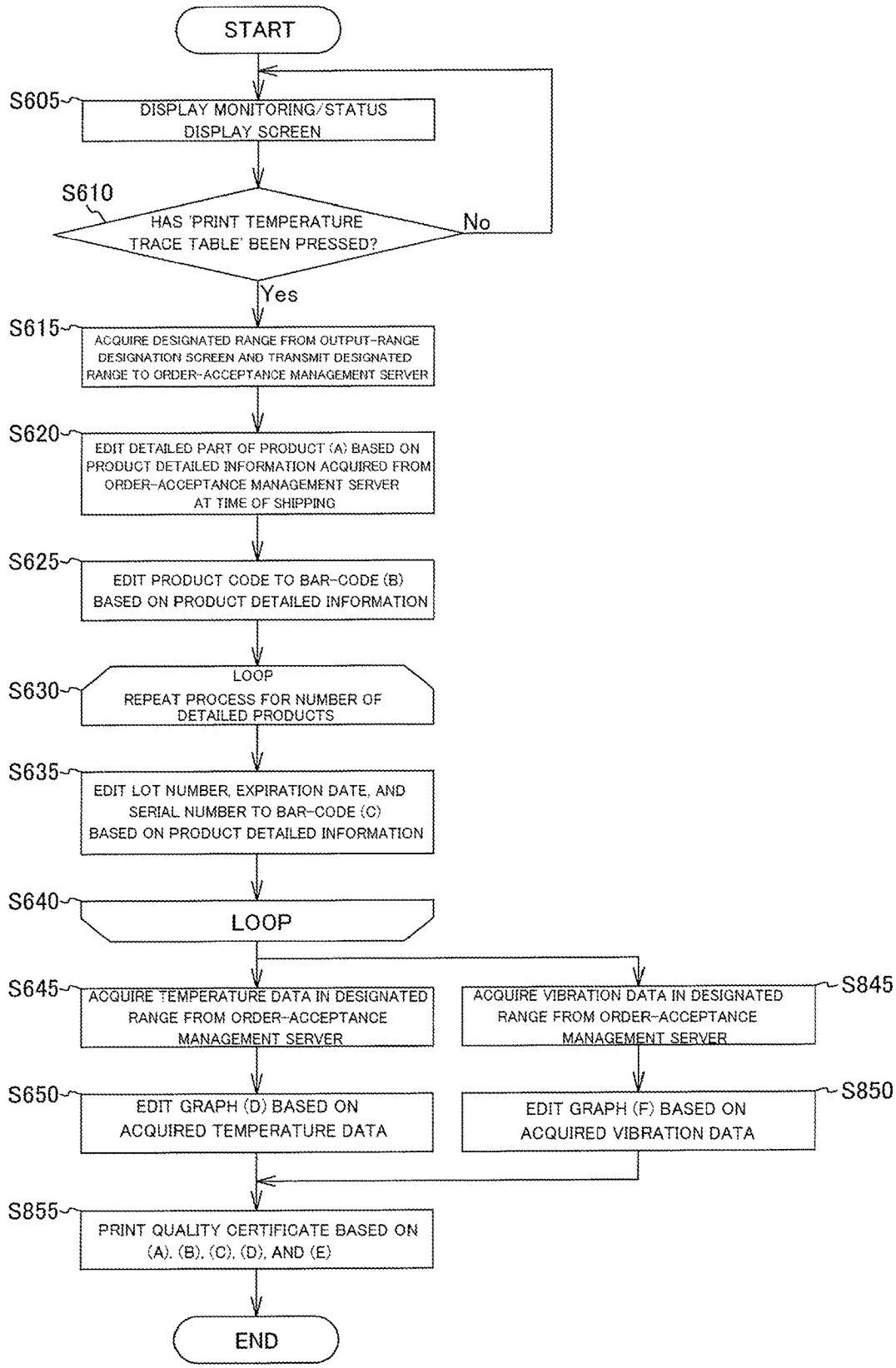
FIG. 24 is a flowchart illustrating a print-data editing process performed by a PC in the delivery unit according to the third embodiment of the present invention.

FIG. 24 is a flowchart illustrating a print-data editing process performed by the PC in the delivery unit according to the third embodiment of the present invention.

At step S845, the PC 25 acquires vibration data in a designated range from the order-acceptance management server 11. At this time, the second transmission unit 55d of the delivery unit 15 transmits a quality data request for requesting quality data to the order-acceptance management server 11 by performing the quality data requesting process as needed.

At step S850, the PC 25 edits a graph (FIG. 22(f)) (F) based on the acquired vibration data.

At step S855, the PC 25 edits the quality certificate data based on the edited pieces of data (A), (B), (C), (D), and (F) and supplies the quality certificate data to the printer 27, to print the quality certificate 27c (FIG. 22) by the printer 27.

According to the present embodiment, since the quality-data generation unit 55a generates quality data of articles based on vibration data acquired from the memory unit 53, the quality certificate 27c including a graphic image representing the data quality of vibrations applied to the storage container 33 in chronological order can be issued. Therefore, at a delivery destination, upon reception of a container that accommodates articles therein, the quality of vibrations applied to the storage container 33 in chronological order relating to a cooling environment in the container can be confirmed immediately at the site.

According to the present embodiment, since the quality-data generation unit 55a adds a graph representing vibrations applied to the storage container 33 from a road surface via a vehicle to the quality data, based on the vibration data acquired from the memory unit 53, the quality certificate 27c including a graphic image representing the vibrations applied to the storage container 33 in chronological order can be issued.

According to the present embodiment, since the printer 27 prints an image including at least one of a lot number and a serial number of an article, or an expiration date of the article in addition to a serial number of the article on a recording medium, the quality certificate 27c associated with a specific article can be issued.

Fourth Embodiment

A delivery unit according to a fourth embodiment of the present invention is described with reference to FIG. 25 to FIG. 27. Among the reference signs in FIG. 25 to FIG. 27, elements same as those denoted by reference signs in FIG. 15 to FIG. 17 have the same configuration as those illustrated in FIG. 15 to FIG. 17, and thus descriptions thereof are omitted.

<Quality Certificate Including Humidity Data>

Figure 25:
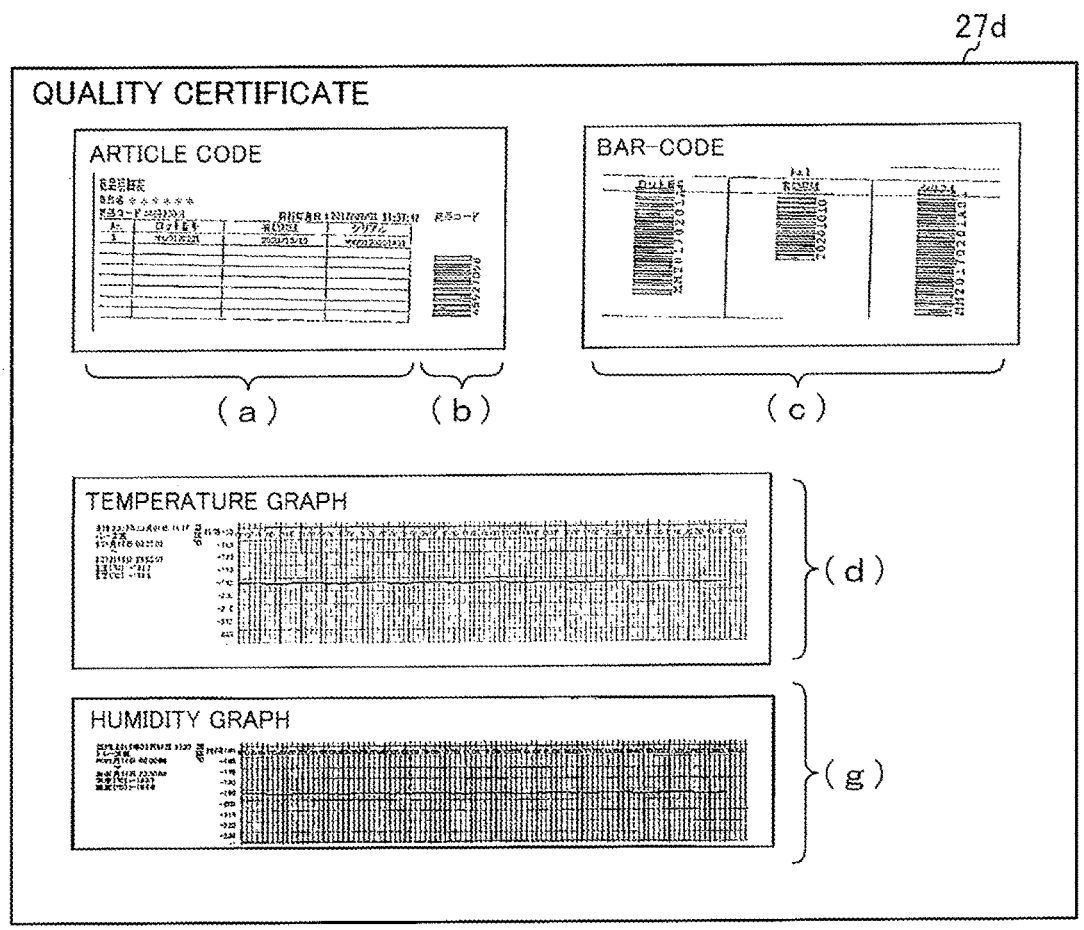
FIGS. 25(a) to (g) are diagrams illustrating respective parts in a quality certificate printed by a printer of a delivery unit according to a fourth embodiment of the present invention.

FIG. 25 are diagrams illustrating respective parts in a quality certificate printed by a printer of the delivery unit according to the fourth embodiment of the present invention.

When the 'PRINT' button B21 included in the print-range designation screen 65 illustrated in FIG. 14 is pressed, a quality certificate 27d illustrated in FIG. 25 is printed.

As illustrated in FIG. 25, in the quality certificate 27d, a product code (b) such as a lot number, an expiration date, and a serial number, a bar-code (c) such as a lot number, an expiration date, and a serial number, a temperature graph (d), and a humidity graph (g) are arranged as an article code.

<Association of Respective Files>

Figure 26:
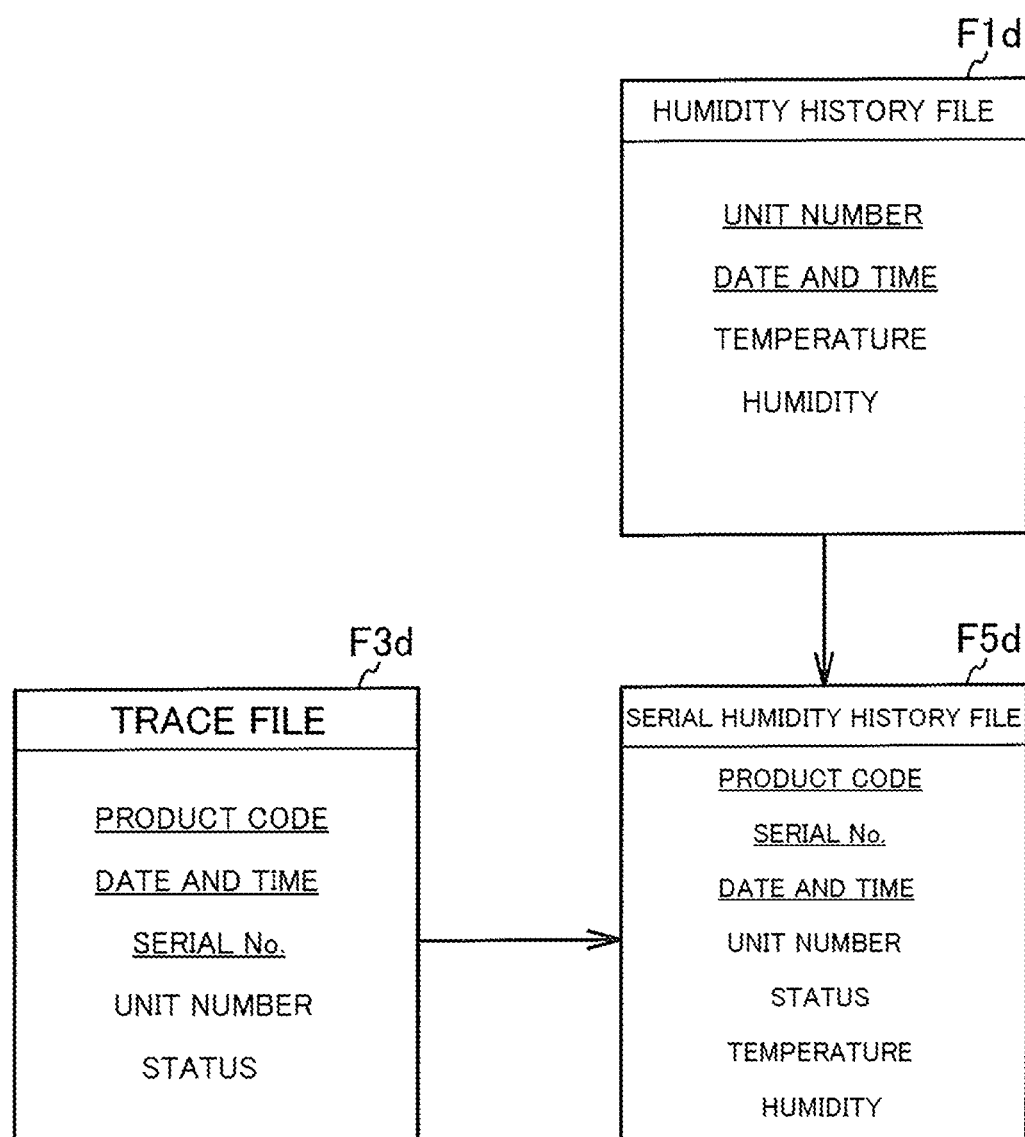
FIG. 26 is a diagram illustrating association of respective files according to the fourth embodiment of the present invention.

FIG. 26 is a diagram illustrating association of respective files according to the fourth embodiment of the present invention.

The order-acceptance management server 11 acquires temperature data and humidity data from the data logger 39 provided in the delivery unit 15, adds a unit number and a date and time to the temperature data, to generate a temperature history file F1.

The order-acceptance management server 11 acquires status information updated by the PC 25 of the delivery unit 15, to generate a trace file F3 in which a product code, a date and time, a serial number, a unit number, and a status are associated with each other, as status information.

The order-acceptance management server 11 uses the unit number included in the trace file F3 as a key to extract the temperature data and the humidity data from the temperature history file F1 having these keys to generate a serial temperature-history file F5, and memorizes the serial temperature-history file F5 in the database DB 13.

<Print-Data Editing Process>

Figure 27:
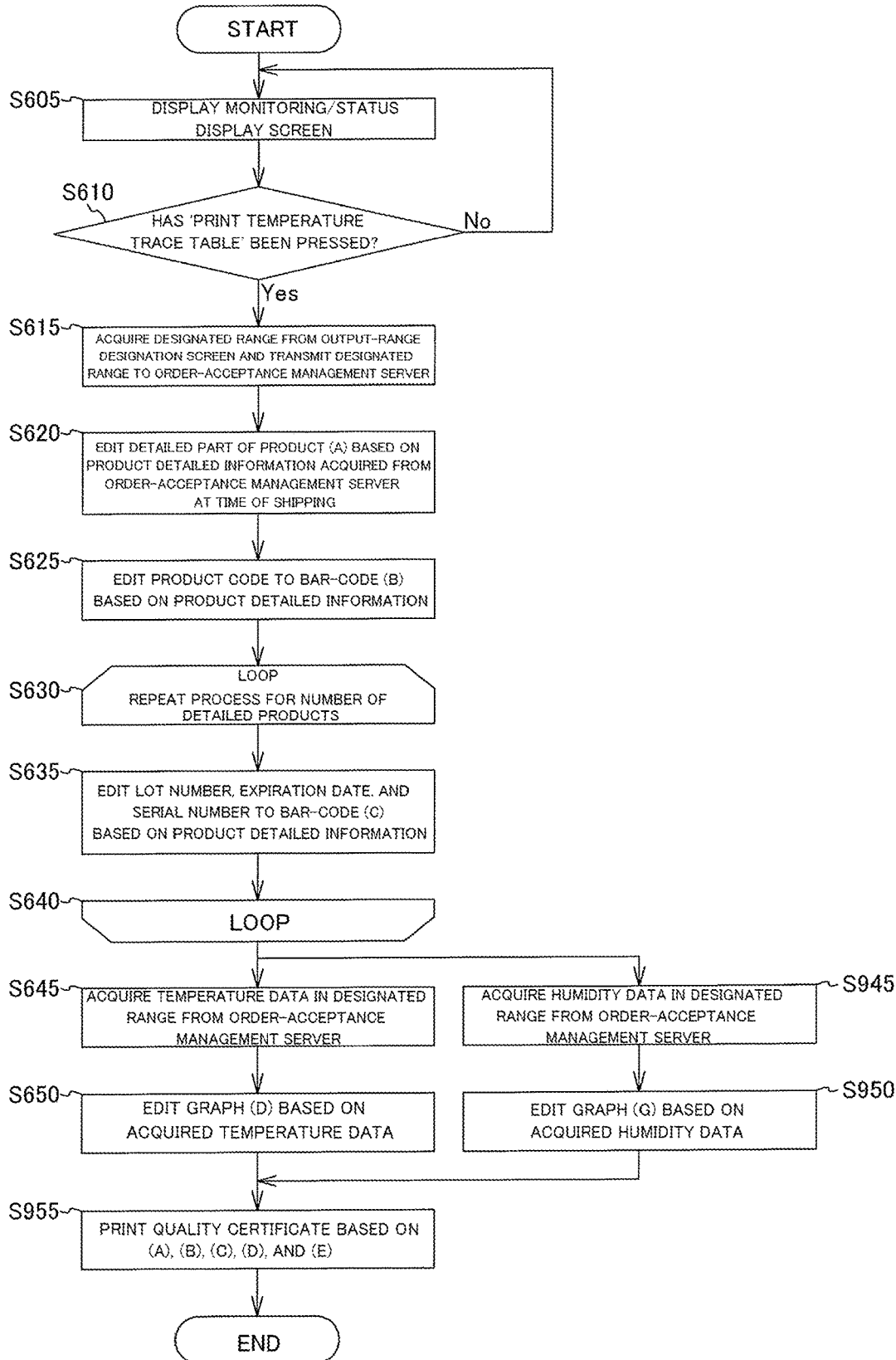
FIG. 27 is a flowchart illustrating a print-data editing process performed by a PC in the delivery unit according to the fourth embodiment of the present invention.

FIG. 27 is a flowchart illustrating a print-data editing process performed by the PC in the delivery unit according to the fourth embodiment of the present invention.

At step S945, the PC 25 acquires humidity data in a designated range from the order-acceptance management server 11. At this time, the second transmission unit 55d of the delivery unit 15 transmits a quality data request for requesting quality data to the order-acceptance management server 11 by performing the quality data requesting process as needed.

At step S950, the PC 25 edits a graph (FIG. 25(g)) (G) based on the acquired humidity data.

At step S955, the PC 25 edits the quality certificate data based on the edited pieces of data (A), (B), (C), (D), and (G) and supplies the quality certificate data to the printer 27, to print the quality certificate 27d (FIG. 25) by the printer 27.

According to the present embodiment, since the quality-data generation unit 55a generates quality data of articles based on the humidity data acquired from the memory unit 53, a quality certificate 27d including a graphic image representing the quality of the humidity data in the storage container 33 in chronological order can be issued. Therefore, at a delivery destination, upon reception of a container that accommodates articles therein, the humidity quality in the storage container 33 in chronological order relating to a cooling environment in the container can be confirmed immediately at the site.

According to the present embodiment, since the quality-data generation unit 55a adds a graph representing the humidity in the storage container 33 to the quality data, based on the humidity data acquired from the memory unit 53, the quality certificate 27d including a graphic image representing the humidity in the storage container 33 in chronological order can be issued.

According to the present embodiment, since the printer 27 prints an image including at least one of a lot number and a serial number of an article, or an expiration date of the article in addition to a serial number of the article on a recording medium, the quality certificate 27d associated with a specific article can be issued.

Fifth Embodiment

A delivery unit according to a fifth embodiment of the present invention is described with reference to FIG. 28 to FIG. 30. Among the reference signs in FIG. 28 to FIG. 30, elements same as those denoted by reference signs in FIG. 15 to FIG. 17 have the same configuration as those illustrated in FIG. 15 to FIG. 17, and thus descriptions thereof are omitted.

<Quality Certificate Including Opened/Closed State Data>

Figure 28:
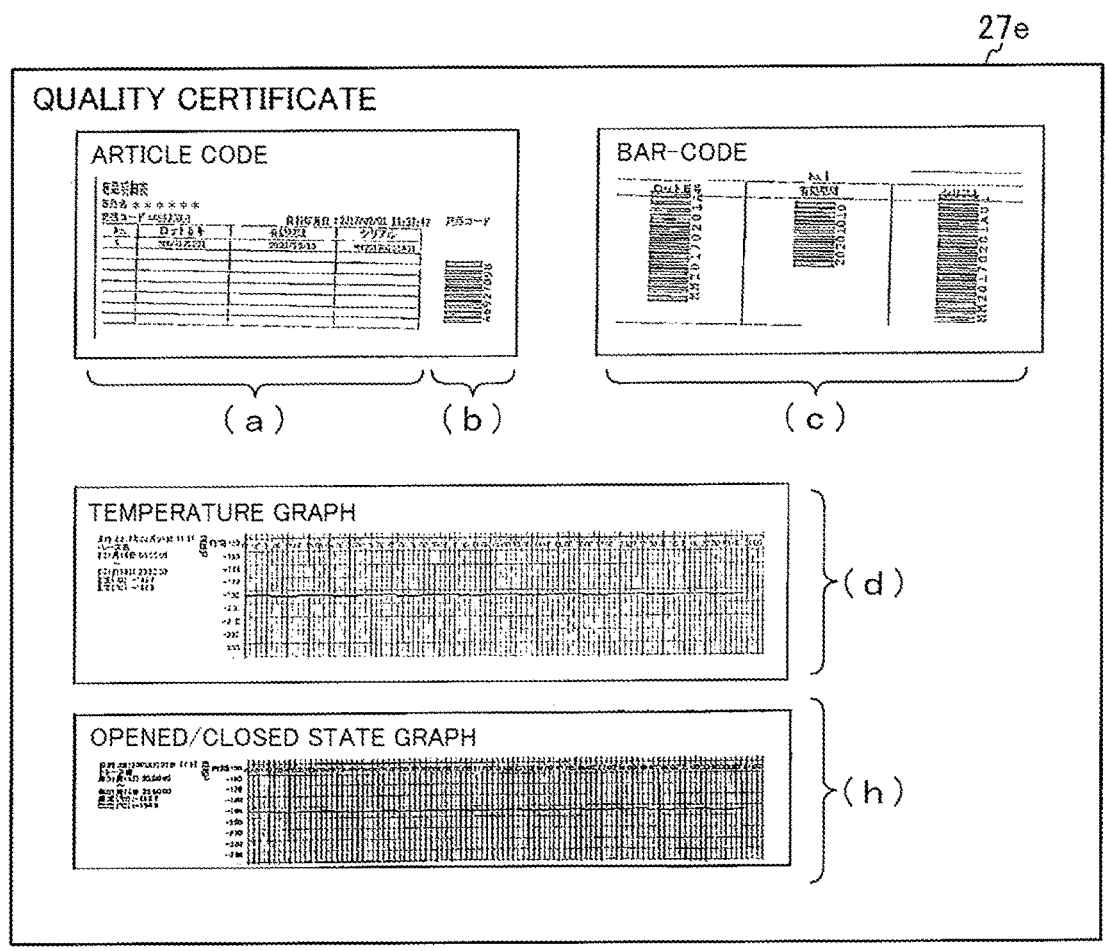
FIGS. 28(a) to (h) are diagrams illustrating respective parts in a quality certificate printed by a printer of a delivery unit according to a fifth embodiment of the present invention.

FIG. 28 are diagrams illustrating respective parts in a quality certificate printed by a printer of the delivery unit according to the fifth embodiment of the present invention.

When the 'PRINT' button B21 included in the print-range designation screen 65 illustrated in FIG. 14 is pressed, a quality certificate 27e illustrated in FIG. 28 is printed.

As illustrated in FIG. 28, in the quality certificate 27e, a product code (b) such as a lot number, an expiration date, and a serial number, a bar-code (c) such as a lot number, an expiration date, and a serial number, a temperature graph (d), and an opened/closed state graph (h) are arranged as an article code.

In the opened/closed state graph (h) illustrated in FIG. 28, there is such a tendency that as the measurement time becomes longer, a line segment indicating an opened state becomes thinner. However, in an actual opened/closed state graph, needless to mention, the opened state is in a rectangular waveform as illustrated in FIG. 31(h).

<Association of Respective Files>

Figure 29:
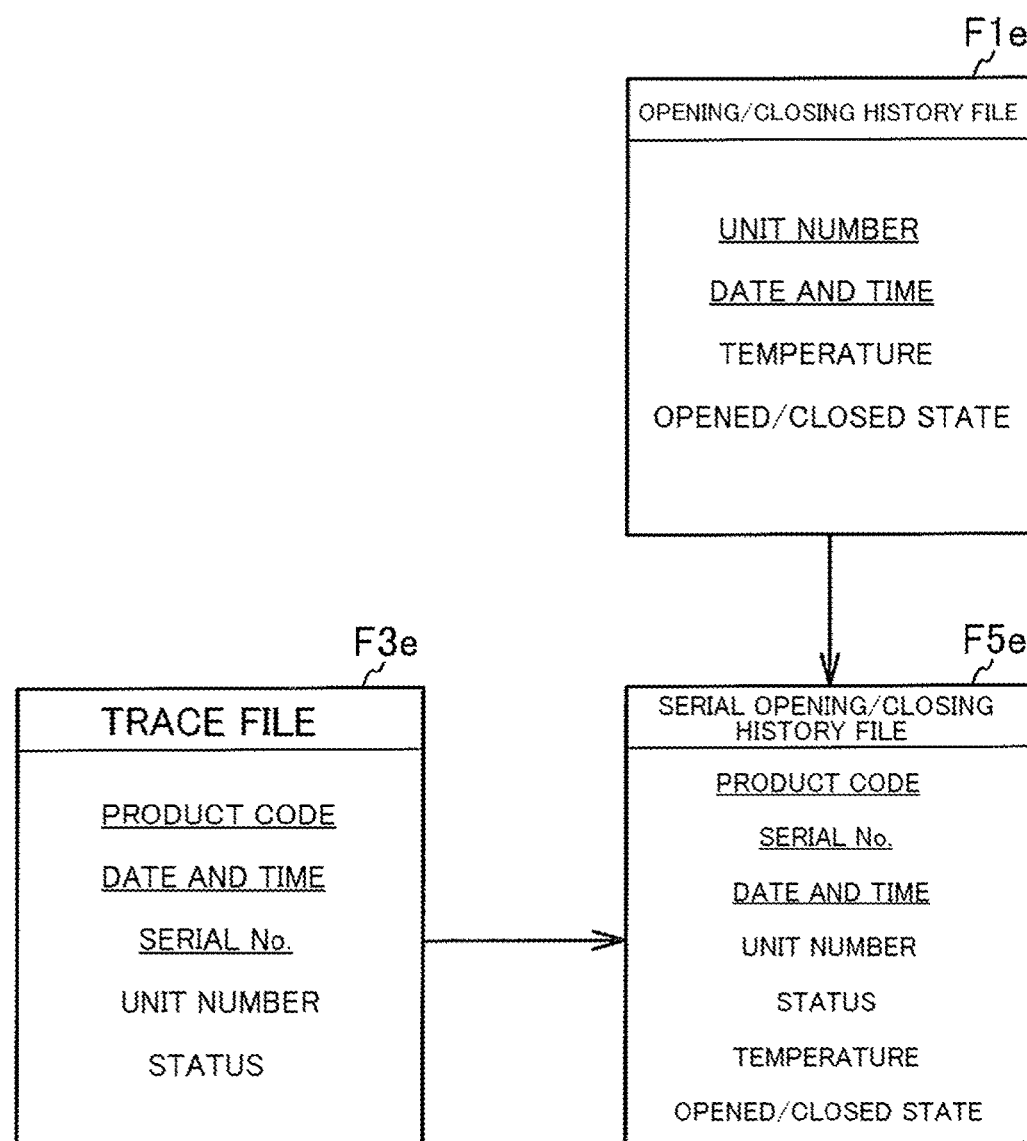
FIG. 29 is a diagram illustrating association of respective files according to the fifth embodiment of the present invention.

FIG. 29 is a diagram illustrating association of respective files according to the fifth embodiment of the present invention.

The order-acceptance management server 11 acquires temperature data and opened/closed state data from the data logger 39 provided in the delivery unit 15, adds a unit number and a date and time to the temperature data, to generate a temperature history file F1.

The order-acceptance management server 11 acquires status information updated by the PC 25 of the delivery unit 15, to generate a trace file F3 in which a product code, a date and time, a serial number, a unit number, and a status are associated with each other, as status information.

The order-acceptance management server 11 uses the unit number included in the trace file F3 as a key to extract the temperature data and the opened/closed state data from the temperature history file F1 having these keys to generate a serial temperature-history file F5, and memorizes the serial temperature-history file F5 in the database DB 13.

<Print-Data Editing Process>

Figure 30:
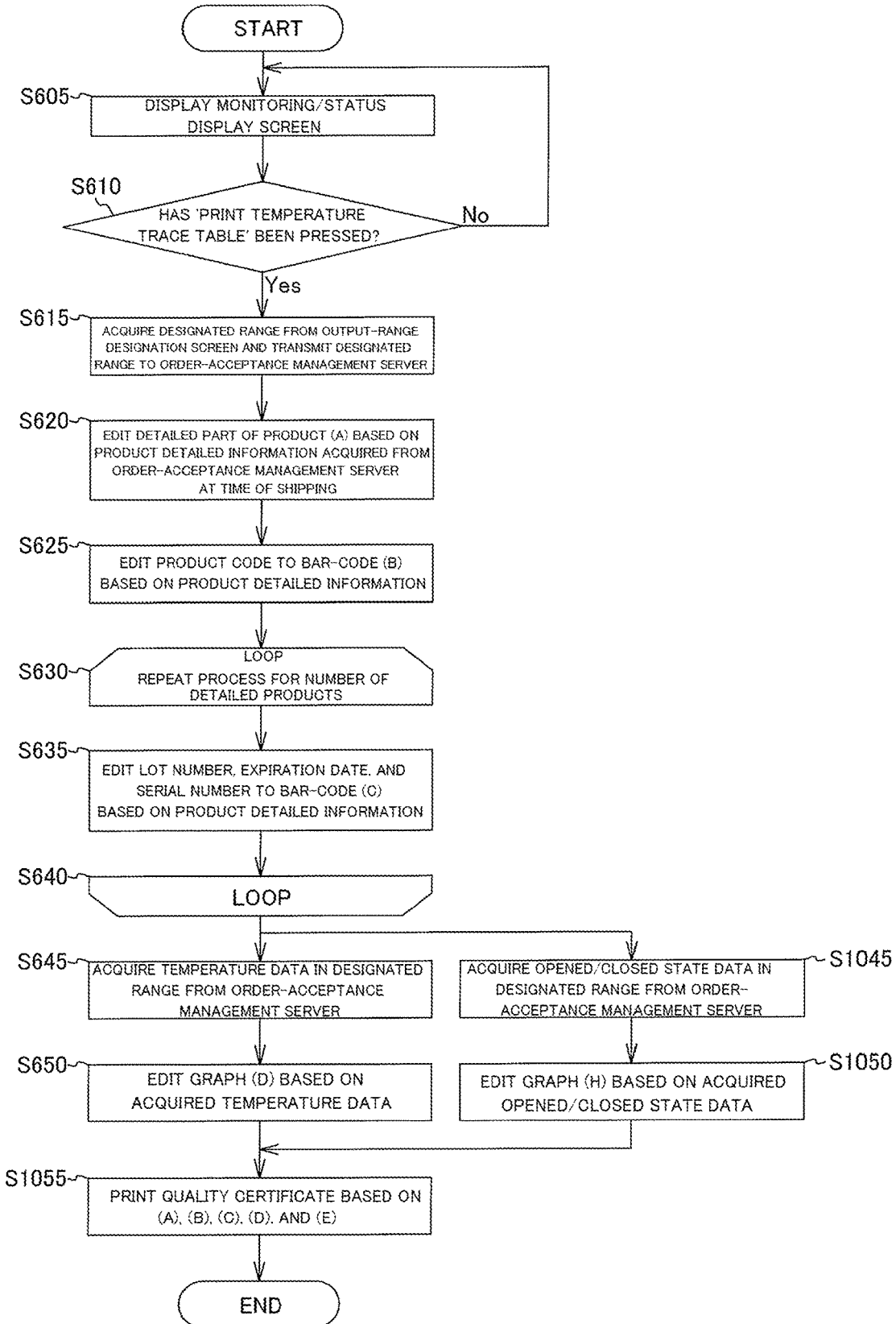
FIG. 30 is a flowchart illustrating a print-data editing process performed by a PC in the delivery unit according to the fifth embodiment of the present invention.

FIG. 30 is a flowchart illustrating a print-data editing process performed by the PC in the delivery unit according to the fifth embodiment of the present invention.

At step S1045, the PC 25 acquires opened/closed state data in a designated range from the order-acceptance management server 11. At this time, the second transmission unit 55d of the delivery unit 15 transmits a quality data request for requesting quality data to the order-acceptance management server 11 by performing the quality data requesting process as needed.

At step S1050, the PC 25 edits a graph (FIG. 28(h)) (G) based on the acquired opened/closed state data.

At step S1055, the PC 25 edits the quality certificate data based on the edited pieces of data (A), (B), (C), (D), and (H) and supplies the quality certificate data to the printer 27, to print the quality certificate 27e (FIG. 28) by the printer 27.

According to the present embodiment, since the quality-data generation unit 55a adds opened/closed state data of a lid acquired from the memory unit 53 to quality data of articles, the quality certificate 27a including a graphic image representing the quality of the opened/closed state data of the lid provided in the storage container 33 in chronological order can be issued. Therefore, at a delivery destination, upon reception of a container that accommodates articles therein, the opened/closed state of the lid and the temperature quality in chronological order of a cooling environment in the container can be confirmed immediately at the site.

According to the present embodiment, since the quality-data generation unit 55a adds opened/closed state data of a lid acquired from the memory unit 53 to the graph representing the temperature in the storage container 33, to generate quality data, the quality certificate 27a including a graphic image representing the opened/closed state of the lid of the storage container 33 in chronological order can be issued.

According to the present embodiment, since the printer 27 prints an image including at least one of a lot number and a serial number of an article, or an expiration date of the article in addition to a serial number of the article on a recording medium, the quality certificate 27a associated with a specific article can be issued.

Sixth Embodiment

A delivery unit according to a sixth embodiment of the present invention is described with reference to FIG. 31 to FIG. 33. Among the reference signs in FIG. 31 to FIG. 33, elements same as those denoted by reference signs in FIG. 15 to FIG. 17 have the same configuration as those illustrated in FIG. 15 to FIG. 17, and thus descriptions thereof are omitted.

<Quality Certificate Including Data Group>

Figure 31:
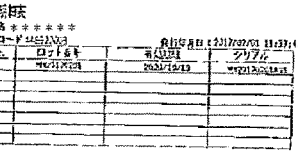
FIGS. 31(a) to (i) are diagrams illustrating respective parts in a quality certificate printed by a printer of a delivery unit according to a sixth embodiment of the present invention.

FIG. 31 are diagrams illustrating respective parts in a quality certificate printed by a printer of the delivery unit according to the sixth embodiment of the present invention.

When the 'PRINT' button B21 included in the print-range designation screen 65 illustrated in FIG. 14 is pressed, a quality certificate 27f illustrated in FIG. 31 is printed.

As illustrated in FIG. 31, in the quality certificate 27f, a product code (b) such as a lot number, an expiration date, and a serial number, a bar-code (c) such as a lot number, an expiration date, and a serial number, and a graph group (1) are arranged as an article code.

The graph group (I) includes a temperature graph, a liquid level graph, a vibration graph, a humidity graph, and an opened/closed state graph.

<Association of Respective Files>

Figure 32:
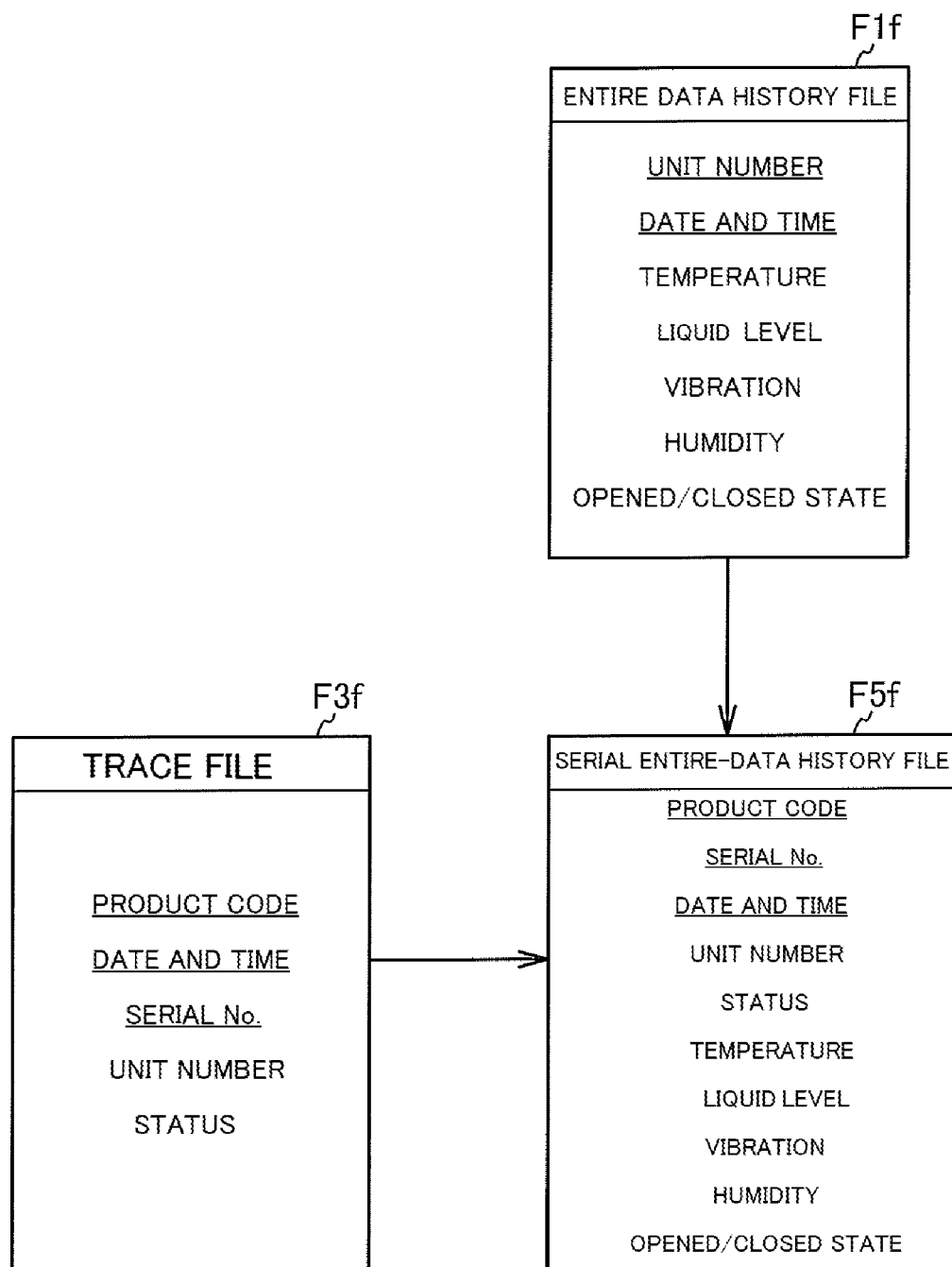
FIG. 32 is a diagram illustrating association of respective files according to the sixth embodiment of the present invention.

FIG. 32 is a diagram illustrating association of respective files according to the sixth embodiment of the present invention.

The order-acceptance management server 11 acquires temperature data, liquid level data, vibration data, humidity data, and opened/closed state data from the data logger 39 provided in the delivery unit 15, adds a unit number and a date and time to a data group, to generate a temperature history file F1.

The order-acceptance management server 11 acquires status information updated by the PC 25 of the delivery unit 15, to generate a trace file F3 in which a product code, a date and time, a serial number, a unit number, and a status are associated with each other, as status information.

The order-acceptance management server 11 uses the unit number included in the trace file F3 as a key to extract the temperature data, the liquid level data, the vibration data, the humidity data, and the opened/closed state data from the temperature history file F1 having these keys to generate a serial temperature-history file F5, and memorizes the serial temperature-history file F5 in the database DB 13.

<Print-Data Editing Process>

Figure 33:
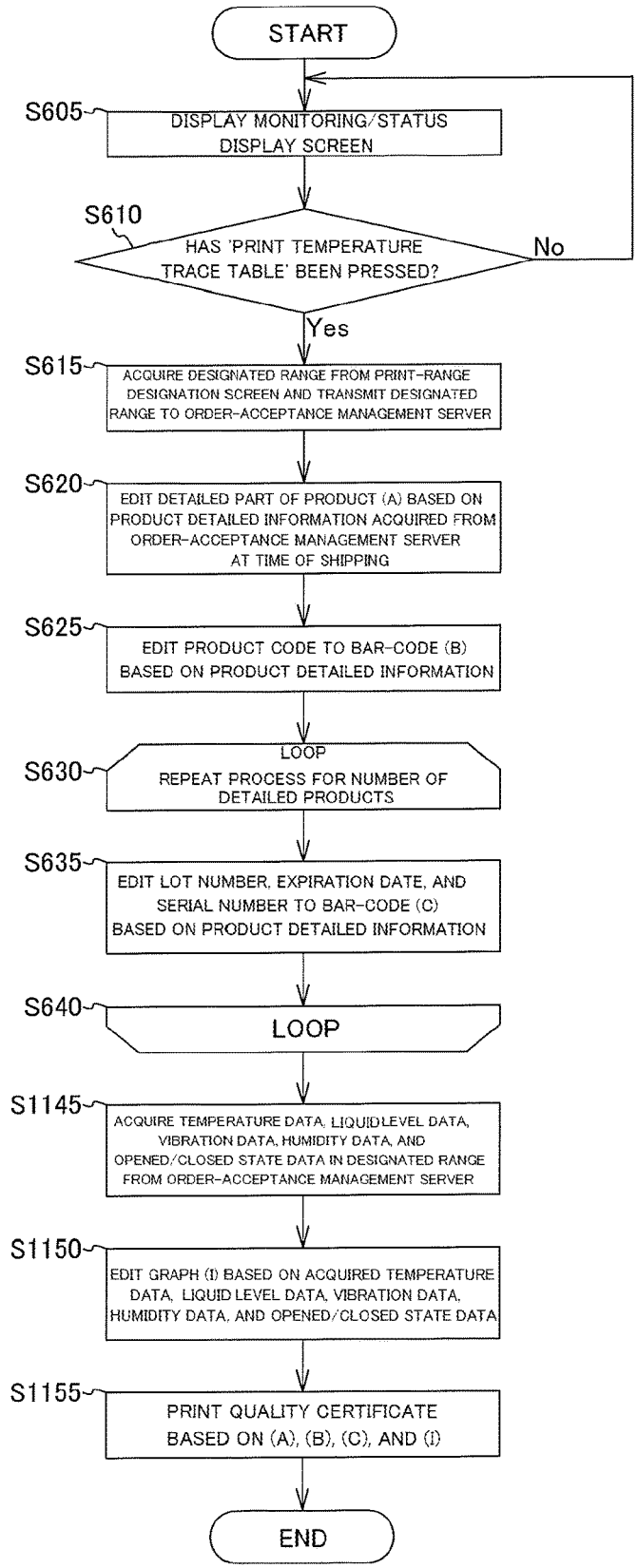
FIG. 33 is a flowchart illustrating a print-data editing process performed by a PC in the delivery unit according to the sixth embodiment of the present invention.

FIG. 33 is a flowchart illustrating a print-data editing process performed by the PC in the delivery unit according to the sixth embodiment of the present invention.

At step S1145, the PC 25 acquires temperature data, liquid level data, vibration data, humidity data, and opened/closed state data in a designated range from the order-acceptance management server 11. At this time, the second transmission unit 55d of the delivery unit 15 transmits a quality data request for requesting quality data to the order-acceptance management server 11 by performing the quality data requesting process as needed.

At step S1150, the PC 25 edits a graph group (FIG. 31(i)) (I) based on the acquired temperature data, liquid level data, vibration data, humidity data, and opened/closed state data.

At step S1155, the PC 25 edits the quality certificate data based on the edited pieces of data (A), (B), (C), and (I) and supplies the quality certificate data to the printer 27, to print the quality certificate 27f (FIG. 31) by the printer 27. On the quality certificate 27f, a temperature graph, a liquid level graph, a vibration graph, a humidity file, and an opened/closed state graph are printed as the graph group (1).

According to the present embodiment, since the quality-data generation unit 55a adds liquid level data, vibration data, humidity data, and opened/closed state data to temperature data, the quality certificate 27f including respective graphic images in chronological order can be issued. Therefore, at a delivery destination, upon reception of a container that accommodates articles therein, the quality in chronological order of a cooling environment in the container can be confirmed immediately at the site.

According to the present embodiment, since the quality-data generation unit 55a sets temperature data, liquid level data, vibration data, humidity data, and opened/closed state data as quality data, the quality certificate 27a including the respective graphic images in chronological order can be issued.

According to the present embodiment, since the printer 27 prints an image including at least one of a lot number and a serial number of an article, or an expiration date of the article in addition to a serial number of the article on a recording medium, the quality certificate 27a associated with a specific article can be issued.

<Modification>

In the first to sixth embodiments, it is configured such that pieces of data such as temperature data, liquid level data, vibration data, humidity data, and opened/closed state data collected by the delivery unit 15 are once accumulated in the database DB 13 via the order-acceptance management server 11, the delivery unit 15 transmits a quality data request to the order-acceptance management server 11 as needed, and after the delivery unit 15 has acquired the data from the database DB 13, a quality certificate is printed. However, the present invention is not limited to such case.

That is, as a modification of the present invention, it can be configured such that a hard disk HDD is provided in the delivery unit 15, temperature data, liquid level data, vibration data, humidity data, and opened/closed state data collected by the delivery unit 15 are once accumulated in the hard disk HDD, and after the data is acquired from the hard disk HDD as needed, a quality certificate is printed.

<Summary of Actions and Effects of Aspects in the Present Embodiment>

<First Aspect>

The delivery unit 15 of the present aspect is the delivery unit 15 mounted on the vehicle 21, and is used at the time of accommodating articles in the storage container 33 filled with a cooling gas and delivering the articles. The delivery unit 15 is characterized by including the thermometer Se1 that measures a temperature in the storage container 33, the memory unit 53 that memorizes the measured temperature data in chronological order, the quality-data generation unit 55a that generates quality data of articles based on the temperature data acquired from the memory unit 53, the print-data editing unit 55h that edits print data relating to a quality certificate including a graphic image representing the quality in chronological order of a cooling environment in the storage container 33 accommodating articles therein during delivery, based on a serial number of the article and quality data, and the printer 27 that prints print data relating to the quality certificate on a recording medium.

According to the present aspect, the print data relating to the quality certificate including the graphic image representing the quality in chronological order of the cooling environment in the storage container 33 accommodating articles therein during delivery is edited based on the serial number of the article and the quality data, and is printed on the recording medium to create the quality certificate 27a, thereby enabling to issue the quality certificate 27a. Therefore, at a delivery destination, upon reception of the container that accommodates articles therein, the quality in chronological order of the cooling environment in the container can be immediately confirmed at the site.

<Second Aspect>

The delivery unit 15 according to the present aspect is characterized by including the display input unit 55f that displays a printing start date-and-time column and a printing end date-and-time column prompting input of a printing date-and-time range relating to temperature data to be printed on the quality certificate 27a, and the print-range acquisition unit 55g that acquires a printing date-and-time range represented by the printing start date-and-time and the printing end date-and-time displayed on the display input unit 55f. The quality-data generation unit 55a generates quality data of the articles based on the temperature data acquired from the memory unit 53 corresponding to the printing date-and-time range acquired by the print-range acquisition unit 55g.

According to the present aspect, the quality-data generation unit 55a can issue the quality certificate 27a including a graphic image representing the quality in chronological order of the range designated by the printing date-and-time range, by generating the quality data of the articles based on the temperature data acquired from the memory unit 53 corresponding to the printing date-and-time range acquired by the print-range acquisition unit 55g. Therefore, at a delivery destination, upon reception of a container that accommodates articles therein, the quality in chronological order of a cooling environment in the container can be confirmed immediately at the site.

<Third Aspect>

The delivery unit 15 according to the present aspect is characterized by including the liquid level indicator Se2 that measures a liquid level of a cooling gas filled in the storage container 33, in which the memory unit 53 memorizes therein the measured liquid level in chronological order, and the quality-data generation unit 55a generates quality data of the articles based on the liquid level data acquired from the memory unit 53.

According to the present aspect, the quality-data generation unit 55a generates the quality data of the articles based on the liquid level data acquired from the memory unit 53, thereby enabling to issue the quality certificate 27a including a graphic image representing the quality of the liquid level data of the cooling gas in chronological order. Therefore, at a delivery destination, upon reception of a container that accommodates articles therein, the quality of the liquid level of the cooling gas in chronological order relating to a cooling environment in the container can be immediately confirmed at the site.

<Fourth Aspect>

The quality-data generation unit 55a according to the present aspect is characterized by adding a graph representing the liquid level of a cooling gas to quality data based on liquid level data acquired from the memory unit 53.

According to the present aspect, the quality-data generation unit 55a adds the graph representing the liquid level of the cooling gas to the quality data based on the liquid level data acquired from the memory unit 53, thereby enabling to issue the quality certificate 27a including a graphic image representing the liquid level of the cooling gas in chronological order.

<Fifth Aspect>

The delivery unit 15 according to the present aspect is characterized by including the vibration indicator Se3 that measures vibrations applied to the storage container 33 from a road surface via a vehicle, in which the memory unit 53 memorizes therein measured vibration data in chronological order, and the quality-data generation unit 55a generates quality data of articles based on the vibration data acquired from the memory unit 53.

According to the present aspect, the quality-data generation unit 55a generates the quality data of the articles based on the vibration data acquired from the memory unit 53, thereby enabling to issue the quality certificate 27a including a graphic image representing the quality of the vibration data applied to the storage container 33 in chronological order. Therefore, at a delivery destination, upon reception of a container that accommodates articles therein, the quality of vibrations applied to the storage container 33 in chronological order relating to a cooling environment in the container can be immediately confirmed at the site.

<Sixth Aspect>

The quality-data generation unit 55a according to the present aspect is characterized by adding a graph representing vibrations applied to the storage container 33 from a road surface via a vehicle to quality data based on vibration data acquired from the memory unit 53.

According to the present aspect, the quality-data generation unit 55a adds the graph representing vibrations applied to the storage container 33 from the road surface via the vehicle to the quality data based on the vibration data acquired from the memory unit 53, thereby enabling to issue the quality certificate 27a including a graphic image representing vibrations applied to the storage container 33 in chronological order.

<Seventh Aspect>

The delivery unit 15 according to the present aspect is characterized by including the hygrometer Se5 that measures a humidity in the storage container 33, in which the memory unit 53 memorizes therein measured humidity data in chronological order, and the quality-data generation unit 55a generates quality data of articles based on the humidity data acquired from the memory unit 53.

According to the present aspect, the quality-data generation unit 55a generates the quality data of articles based on the humidity data acquired from the memory unit 53, thereby enabling to issue the quality certificate 27a including a graphic image representing the quality of humidity data in the storage container 33 in chronological order. Therefore, at a delivery destination, upon reception of a container that accommodates articles therein, the quality of humidity in the storage container 33 in chronological order relating to a cooling environment in the container can be immediately confirmed at the site.

<Eighth Aspect>

The quality-data generation unit 55a according to the present aspect is characterized by adding a graph representing the humidity in the storage container 33 to quality data based on humidity data acquired from the memory unit 53.

According to the present aspect, the quality-data generation unit 55a adds the graph representing the humidity in the storage container 33 to the quality data based on the humidity data acquired from the memory unit 53, thereby enabling to issue the quality certificate 27a including a graphic image representing the humidity in the storage container 33 in chronological order.

<Ninth Aspect>

The delivery unit 15 according to the present aspect is characterized by including the opening/closing sensor Se4 that measures an opened/closed state of a lid provided in the storage container 33, in which the memory unit 53 memorizes therein detected opened/closed state data of the lid in chronological order, and the quality-data generation unit 55a adds the opened/closed state data of the lid acquired from the memory unit 53 to quality data of articles.

According to the present aspect, the quality-data generation unit 55a adds the opened/closed state data of the lid acquired from the memory unit 53 to the quality data of the articles, thereby enabling to issue the quality certificate 27a including a graphic image representing the quality of the opened/closed state of the lid provided in the storage container 33 in chronological order. Therefore, at a delivery destination, upon reception of a container that accommodates articles therein, the opened/closed state of the lid and the temperature quality in chronological order relating to a cooling environment in the container can be immediately confirmed at the site.

<Tenth Aspect>

The quality-data generation unit 55a according to the present aspect adds opened/closed state data of a lid acquired from the memory unit 53 to a graph representing the humidity in the storage container 33, to generate quality data.

According to the present aspect, the quality-data generation unit 55a adds the opened/closed state data of the lid acquired from the memory unit 53 to a graph representing the temperature in the storage container 33 to generate quality data, thereby enabling to issue the quality certificate 27a including a graphic image representing the humidity, together with a graphic image representing the opened/closed state of the lid of the storage container 33 in chronological order.

<Eleventh Aspect>

The printer 27 according to the present aspect is characterized in that an image including at least one of a lot number and a serial number of an article, or an expiration date of the article is printed on a recording medium in addition to a serial number of the article.

According to the present aspect, the printer 27 prints an image including at least one of a lot number and a serial number of an article, or an expiration date of the article on the recording medium, in addition to a serial number of the article, thereby enabling to issue the quality certificate 27a relating to a specific article.

<Twelfth Aspect>

The delivery system 1 according to the present aspect is the delivery system 1 including the delivery unit 15 according to any one of the first to eleventh aspects, and the order-acceptance management server 11. The delivery unit 15 includes the first transmission unit 55c that transmits quality data generated by the quality-data generation unit 55a to the order-acceptance management server 11, the second transmission unit 55d that transmits a quality data request to the order-acceptance management server 11 as needed, and the first reception unit 55e that receives quality data from the order-acceptance management server 11. The order-acceptance management server 11 includes the second reception unit 11b that receives quality data from the delivery unit 15, the database DB 13 that accumulates therein pieces of quality data received from the delivery unit 15, and the third transmission unit 11a that transmits quality data acquired from the database DB 13 to the delivery unit 15, upon reception of a quality data request from the delivery unit 15.

According to the present aspect, the delivery unit 15 prints a graphic image representing the quality in chronological order of a cooling environment in the storage container 33 that accommodates articles therein during delivery, based on the quality data received from the order-acceptance management server 11 on a recording medium to create the quality certificate 27a, thereby enabling to issue the quality certificate 27a. Therefore, at a delivery destination, upon reception of a container that accommodates the articles therein, the quality in chronological order of a cooling environment in the container can be immediately confirmed at the site.

<Thirteenth Aspect>

The delivery system 1 according to the present aspect includes the client terminal 5. The order-acceptance management server 11 includes the fourth transmission unit 11c that transmits quality data acquired from the database DB 13 to the client terminal 5, upon reception of a quality data request from the client terminal 5. The client terminal 5 includes the fifth transmission unit 5a that transmits a quality data request to the order-acceptance management server 11 as needed, and the third reception unit 5b that receives quality data from the order-acceptance management server 11.

According to the present aspect, the client terminal 5 can confirm the quality in chronological order of a cooling environment in the storage container 33 that accommodates articles therein during delivery based on the quality data from the order-acceptance management server 11.

REFERENCE SIGNS LIST

1 delivery system, 5 client terminal, 5a fifth transmission unit, 5b third reception unit, 11 order-acceptance management server 11a third transmission unit, 11b second reception unit, 11c fourth transmission unit, 13 database DB, 15 delivery unit, 21 vehicle, 27 printer, 27a quality certificate, 33 storage container, 39 data logger, 53 memory unit, 55a quality-data generation unit, 55c first transmission unit, 55d second transmission unit, 55e first reception unit, 55f display input unit, 55g print-range acquisition unit, 55h print-data editing unit, Se1 thermometer, Se2 liquid level indicator, Se3 vibration indicator, Se4 opening/closing sensor, Se5 hygrometer, Se6 voltage detection sensor, Se7 voltage detection sensor, N1 to N3 network.

What is claimed is:

1. A delivery unit mounted on a vehicle and is used when articles are accommodated in a storage container 33 filled with a cooling gas and delivered, the delivery unit comprising:
    a thermometer Se1 that is provided in the storage container 33 and to measure a temperature in the storage container 33;
    a liquid level indicator Se2 that is provided in the storage container 33 to measure a liquid level when the cooling gas filled in the storage container 33 is liquefied;
    a temperature measurement unit 51s1;
    a liquid-level measurement unit 51s2;
    a printer 27;
    a control unit 55;
    a memory unit 53;
    wherein the temperature measurement unit 51s1 measures the temperature in the storage container 33 by the thermometer Se1 and outputs a measurement data to the memory unit 53;
    wherein the liquid-level measurement unit 51s2 measures the liquid level when the cooling gas filled in the storage container 33 is liquefied by the liquid level indicator Se2 and outputs a measurement data to the memory unit 53;
    the control unit 55 further includes a quality-data generation unit 55a, a print-data editing unit 55h and a printing unit 55b;
    wherein the quality-data generating unit 55a generates quality data of the articles based on temperature data and liquid level data acquired from the memory unit 53;
    wherein the print-data editing unit 55h edits print data relating to a quality certificate including a graphic image representing quality in chronological order of a cooling environment in the storage container 33 in time series; and
    wherein the printing unit 55b outputs print data relating to the quality certificate to the printer 27 and prints it on a recording medium.

2. The delivery unit according to claim 1, further comprising a personal computer PC25 includes a CPU 25a, a ROM 25b, a RAM 25b and an operation display unit 25d:
    the control unit 55 further includes a display input unit 55f and a print-range acquisition unit 55g;
    wherein the display input unit 55f displays a printing start date-and-time column and a printing end date-and-time column prompting input of a printing date-and-time range associated with temperature data and humidity data to be printed on the operation display unit 25d;
    wherein the print-range acquisition unit 55g acquires printing date-and-time range represented by a printing start date-and-time and a printing end date-and-time displayed on the operation display unit 25d and stores the printing date-and-time range in a RAM 25c; and
    wherein the quality-data generation unit 55a acquires temperature data and humidity data from the memory unit 53 based on the printing date-and-time range acquired from the RAM 25c, and generates quality data of the articles based on acquired temperature data and humidity data.

3. The delivery unit according to claim 1, wherein the quality-data generation unit 55a adds a graph representing a liquid level when the cooling gas filled in the storage container 33 is liquefied to the quality data based on humidity data acquired from the memory unit 53.

4. The delivery unit according to claim 1, wherein the printing unit 55b outputs an image including at least one of a lot number and a serial number of the article, or an expiration date of the article in addition to a serial number of the article on the printer 27, and prints it on the recording medium.

5. A delivery system comprising:
    the delivery unit 15 according to claim 1; and
    an order-acceptance management server 11, wherein;
    the control unit 55 includes a first transmission unit 55c, a second transmission unit 55d and a first reception unit 55e;
    the order-acceptance management server 11 includes a second reception unit 11b, a database DB13, a third transmitting unit 11a and a fourth transmitting unit 11c;
    wherein in the delivery unit 15,
    the first transmission unit 55c transmits quality data generated by the quality-data generation unit 55a to the order-acceptance management server 11,
    the second transmission unit 55d transmits a quality data request to the order-acceptance management server 11 as needed, and
    the first reception unit 55e receives quality data from the order-acceptance management server 11, and
    wherein in the order-acceptance management server 11,
    the second reception unit 11b receives quality data from the delivery unit 15,
    the database DB13 accumulate quality data received from the delivery unit 15, and
    the third transmission unit 11a transmits quality data acquired from the database DB13 to the delivery unit 15, upon reception of a quality data request from the delivery unit 15.

6. The delivery system 15 according to claim 5, comprising a client terminal 5;
    the order-acceptance management server 11 includes a fourth transmission unit 11c;

the client terminal 5 includes a fifth transmitting unit 5*a* and a third reception unit 5*b*;

wherein in the order-acceptance management server 11;

the fourth transmission unit 11*c* transmits quality data acquired from the database DB13 to the client terminal 5, upon reception of a quality data request from the client terminal 5, and wherein in the client terminal 5, the fifth transmission unit 5*a* transmits a quality data request to the order-acceptance management server 11 as needed, and the third reception unit 5*b* receives quality data from the order-acceptance management server 11.

\* \* \* \* \*